United States Patent
Higashi et al.

(10) Patent No.: US 11,850,510 B2
(45) Date of Patent: Dec. 26, 2023

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: Nintendo Co., Ltd., Kyoto (JP)

(72) Inventors: Satoko Higashi, Kyoto (JP); Yusaku Shimizu, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 377 days.

(21) Appl. No.: 17/220,933

(22) Filed: Apr. 2, 2021

(65) Prior Publication Data
US 2021/0308573 A1   Oct. 7, 2021

(30) Foreign Application Priority Data
Apr. 3, 2020 (JP) ................. 2020-067246

(51) Int. Cl.
  *A63F 13/00* (2014.01)
  *A63F 13/52* (2014.01)
  *G06T 3/60* (2006.01)
  *G06T 11/00* (2006.01)

(52) U.S. Cl.
  CPC ............... *A63F 13/52* (2014.09); *G06T 3/60* (2013.01); *G06T 11/00* (2013.01)

(58) Field of Classification Search
  None
  See application file for complete search history.

(56) References Cited

U.S. PATENT DOCUMENTS

| | | | | |
|---|---|---|---|---|
| 10,688,395 | B2* | 6/2020 | Oshino | A63F 13/63 |
| 10,981,065 | B2* | 4/2021 | Oshino | A63F 13/46 |
| 2005/0024360 | A1* | 2/2005 | Abe | G06F 3/038 |
| | | | | 345/419 |
| 2005/0176502 | A1* | 8/2005 | Nishimura | A63F 13/10 |
| | | | | 463/31 |
| 2006/0094502 | A1* | 5/2006 | Katayama | A63F 13/2145 |
| | | | | 463/31 |
| 2014/0282013 | A1* | 9/2014 | Amijee | G06F 3/0482 |
| | | | | 715/732 |

OTHER PUBLICATIONS

"Super Mario Maker", Nintendo of America Inc, Available Online at: https://www.nintendo.com/consumer/downloads/manual-WiiU-Super_Mario_Maker.pdf, Retrieved from Internet on Mar. 19, 2020, 19 pages.

* cited by examiner

*Primary Examiner* — Sunit Pandya
(74) *Attorney, Agent, or Firm* — Nixon & Vanderhye, PC

(57) ABSTRACT

In accordance with a placement operation of a user, a part including at least one connection direction can be placed in a first placement direction in a virtual space that is a two-dimensional space including a plurality of square grid divisions, the part being square, and in accordance with a rotation operation of the user, and the part can be changed so that the part is placed in a second placement direction. Then, in accordance with a placement position in the virtual space where the part is placed in the virtual space, the first placement direction when the part is newly placed in the virtual space is determined by rotating the part to be placed in each of the square grid divisions by 90 degrees each time.

25 Claims, 19 Drawing Sheets

| | COLUMN 1 | COLUMN 2 | COLUMN 3 | COLUMN 4 | COLUMN 5 | COLUMN 6 | COLUMN 7 |
|---|---|---|---|---|---|---|---|
| ROW 1 | UPPER LEFT CORNER AREA | | CENTER UPPER EDGE AREA | | | | UPPER RIGHT CORNER AREA |
| ROW 2 | CENTER LEFT EDGE AREA | | CENTER AREA | | | | CENTER RIGHT EDGE AREA |
| ROW 3 | | | CENTER AREA | | | | |
| ROW 4 | LOWER LEFT CORNER AREA | | CENTER LOWER EDGE AREA | | | | LOWER RIGHT CORNER AREA |

VIRTUAL SPACE

FIG. 11

ROUTE PART ROTATION RULES

| | ONE-DIRECTION PART | TWO-DIRECTION I-SHAPED PART | TWO-DIRECTION L-SHAPED PART | THREE-DIRECTION PART | FEATURE |
|---|---|---|---|---|---|
| INITIAL DIRECTION | | | | | |
| CENTER AREA | | | | | SAME AS INITIAL DIRECTION |
| CENTER LOWER EDGE AREA | | | | | SAME AS INITIAL DIRECTION |
| CENTER UPPER EDGE AREA | | | | | PART HAVING PLURALITY OF DIRECTIONS ROTATES 180 DEGREES FROM CENTER LOWER EDGE |
| CENTER LEFT EDGE AREA | | | | | |
| CENTER RIGHT EDGE AREA | | | | | HORIZONTALLY FLIP FROM CENTER LEFT EDGE |
| UPPER LEFT CORNER AREA | | | | | |
| UPPER RIGHT CORNER AREA | | | | | HORIZONTALLY FLIP FROM UPPER LEFT CORNER |
| LOWER LEFT CORNER AREA | | | | | VERTICALLY FLIP FROM UPPER LEFT CORNER ROTATE 180 DEGREES FROM UPPER RIGHT CORNER |
| LOWER RIGHT CORNER AREA | | | | | VERTICALLY FLIP FROM UPPER RIGHT CORNER HORIZONTALLY FLIP FROM LOWER LEFT CORNER |
| FEATURE | AT RIGHT EDGE, HORIZONTALLY FLIP FROM INITIAL DIRECTION | AT CENTER LEFT AND RIGHT EDGES, ROTATE 90 DEGREES FROM INITIAL DIRECTION | AT UPPER, LOWER, LEFT, AND RIGHT CORNERS, MATCH SHAPES OF CORNERS | AT CENTER EDGES, MATCH OUTER PERIPHERY AT CORNERS, MATCH UPPER AND LOWER EDGES | |

FIG. 16

ROUTE PART EXCEPTION ROTATION RULES

| | TWO-DIRECTION L-SHAPED PART | FEATURE OF ROUTE THAT CONNECTS |
|---|---|---|
| CENTER UPPER EDGE AREA |  | ROUTE IS NOT PRESENT OR RIGHT ROUTE IS PRESENT OR LEFT AND RIGHT ROUTES ARE PRESENT |
| |  | LEFT ROUTE IS PRESENT |
| CENTER LOWER EDGE AREA |  | ROUTE IS NOT PRESENT OR LEFT ROUTE IS PRESENT OR LEFT AND RIGHT ROUTES ARE PRESENT |
| |  | RIGHT ROUTE IS PRESENT |
| CENTER LEFT EDGE AREA |  | ROUTE IS NOT PRESENT OR UPPER ROUTE IS PRESENT OR UPPER AND LOWER ROUTES ARE PRESENT |
| |  | LOWER ROUTE IS PRESENT |
| CENTER RIGHT EDGE AREA |  | ROUTE IS NOT PRESENT OR UPPER ROUTE IS PRESENT OR UPPER AND LOWER ROUTES ARE PRESENT |
| |  | LOWER ROUTE IS PRESENT |

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS-REFERENCE TO RELATED APPLICATION

This application claims priority to Japanese Patent Application No. 2020-067246 filed on Apr. 3, 2020, the entire contents of which are incorporated herein by reference.

FIELD

The technology shown here relates to a storage medium having stored therein an information processing program, an information processing apparatus, an information processing system, and an information processing method for performing the process of forming a virtual space in accordance with a user operation.

BACKGROUND AND SUMMARY

Conventionally, there is a game apparatus that places a part in accordance with a user operation and rotates the placed part, thereby forming a virtual space.

In the game apparatus, however, after the part is placed once, the operation of appropriately rotating the part is required.

Therefore, it is an object of an exemplary embodiment to provide a storage medium having stored therein an information processing program, an information processing apparatus, an information processing system, and an information processing method that are capable of facilitating the operation of placing a part in a virtual space.

To achieve the above object, the exemplary embodiment can employ, for example, the following configurations.

A non-transitory computer-readable storage medium according to the exemplary embodiment has stored therein instructions that, when executed by a processor of an information processing apparatus, cause the information processing apparatus to perform operations including: in accordance with a placement operation of a user, placing, in a first placement direction in a virtual space, a part including at least one connection direction, the part being square; in accordance with a rotation operation of the user, rotating the part placed in the first placement direction in the virtual space so that the part is placed in a second placement direction; if a first part and a second part that are the part placed in the virtual space are adjacent to each other, based on combinations of at least a direction in which the first part is adjacent to the second part, the connection direction included in the first part, and the connection direction included in the second part, determining whether or not the first part and the second part are connected together; and if it is determined that the first part and the second part are connected together, producing in the first part and the second part an effect in a game different from an effect in a game in a case where it is determined that the first part and the second part are not connected together, wherein the placement includes, in accordance with a placement position in the virtual space where the part is placed in the virtual space, determining the first placement direction by rotating the part to be placed in each of the square grid divisions by 90 degrees each time when the part is newly placed in the virtual space.

Based on the above, in a case where a part is placed in a virtual space in accordance with a user operation, a placement direction is determined in accordance with a placement position. Thus, it is possible to facilitate a user operation required to place the part.

Further, the instructions may further cause the information processing apparatus to perform operations including, in accordance with an object movement operation of the user, moving a movement object placed in the virtual space at least within the part placed by the placement operation. In this case, the production of the effect may include, if it is determined that the first part and the second part are connected together, permitting the movement object to move from within the first part to within the second part and also from within the second part to within the first part.

Based on the above, by connecting parts, it is possible to set in the virtual space a route on which a movement object can move.

Further, the part may include, within the part, at least one of a movement-possible route that is a route on which the movement object can move, and a movement-impossible route that is a route on which the movement object cannot move. The instructions may further cause the information processing apparatus to perform operations including, if a part including the movement-possible route is placed, generating a map image representing at least the movement-possible route to display the map image on a display screen.

Based on the above, it is easy to distinguish a route on which the movement object can move.

Further, the generation of the map image may include, if a part including the movement-impossible route is placed, generating the map image including, within the part, the movement-impossible route a display form of which is different from a display form of the movement-possible route.

Based on the above, it is easy to distinguish a route on which the movement object can move and a route on which the movement object cannot move.

Further, the generation of the map image may include generating the map image by, in a route of the part placed in an edge portion of the virtual space, determining as the movement-impossible route a route extending from the edge portion of the virtual space toward outside the virtual space.

Based on the above, it is easy to distinguish a route directed toward outside the virtual space.

Further, the placement may include, in a case where the part is to be newly placed in the virtual space, and if there is at least one adjacent part that is already placed in the virtual space and is a part adjacent to the part, determining the first placement direction so that the greatest number of the adjacent parts are connected to the part.

Based on the above, it is easy to perform the operation of placing parts so that the greatest number of parts are connected together.

Further, the placement may include, in a case where the part is to be newly placed in the virtual space, and if there are a plurality of placement directions in which the greatest number of the adjacent parts are connected to the part, determining, among the plurality of placement directions, a placement direction obtained with the smallest amount of rotation obtained by rotating clockwise from an initial direction set for the part, as the first placement direction.

Based on the above, based on the placement direction of a part before the part is placed, it is possible to reduce the amount of change in the placement direction.

Further, the placement may include, in a case where the part is to be newly placed in the virtual space, and if there are a plurality of placement directions in which the greatest number of the adjacent parts are connected to the part, and also if the part is placed in an edge portion of the virtual space, determining, among the plurality of placement directions, a placement direction in which the smallest number of the connection directions are directed from the edge portion of the virtual space toward outside the virtual space, as the first placement direction.

Based on the above, it is easy to perform the operation of placing part so that a great number of parts are connected together, while reducing the number of routes directed toward outside the virtual space.

Further, the instructions may further cause the information processing apparatus to perform operations including moving at least one of the parts placed in the virtual space to a different position in the virtual space in accordance with a part movement operation of the user and placing the at least one of the parts.

Based on the above, by changing the placement position of a part placed once, it is possible to re-place the part.

Further, the movement of the at least one of the parts to the different position and the placement of the at least one of the parts may include, in a case where the part placed in the virtual space in a pre-movement placement direction that is a placement direction before a movement is moved as a movement part to the different position, if there is not an adjacent part that is already placed in the virtual space and is a part adjacent to the movement part after the movement, placing the movement part in the virtual space by maintaining the pre-movement placement direction, regardless of a placement position in the virtual space after the movement, and if there is the at least one adjacent part, placing the movement part in the virtual space in a post-movement placement direction that is a placement direction of the movement part after a movement, so that the greatest number of the adjacent parts are connected to the movement part after the movement.

Based on the above, even in a case where a part is re-placed, it is possible to facilitate a user operation required to re-place the part.

Further, the movement of the at least one of the parts to the different position and the placement of the at least one of the parts may include, if there are a plurality of placement directions in which the greatest number of the adjacent parts are connected to the movement part after the movement, determining, among the plurality of placement directions, a placement direction obtained with the smallest amount of rotation obtained by rotating clockwise from the pre-movement placement direction, as the post-movement placement direction.

Based on the above, based on the placement direction of a placed part, it is possible to reduce the amount of change in the placement direction when the part is re-placed.

Further, the placement may include placing in the virtual space the part selected from a plurality of types of parts different from each other in the connection direction.

Based on the above, the placement of a part rich in variation is possible.

Further, the placement may include, in a case where the part is to be placed in an edge portion area that is an edge portion of the virtual space, determining the first placement direction so that among the connection directions included in the part, the smallest number of the connection directions are directed from the edge portion of the virtual space toward outside the virtual space.

Based on the above, it is possible to reduce the state where parts are not connected together.

Further, the virtual space may be a two-dimensional space including grid divisions. The placement may include placing parts in accordance with the respective grid divisions.

Based on the above, it is possible to facilitate a user operation when a part is placed in a two-dimensional space.

Further, the grid divisions may include a plurality of square grid divisions. The placement may include rotating the par to be placed in each of the square grid divisions by 90 degrees each time in the grid division in accordance with the grid division, thereby determining a placement direction of the part.

Based on the above, it is possible to facilitate a user operation when a square part is placed in the virtual space.

Further, the placement may include placing in the virtual space the part selected from at least a one-direction part including the connection direction only on one side of the part, a two-direction I-shaped part including the connection direction on each of two sides opposed to each other in the part, a two-direction L-shaped part including the connection direction on each of two sides adjacent to each other in the part, and a three-direction part including the connection direction on each of three sides of the part.

Based on the above, using a wide variety of parts, the placement of a part rich in variation is possible.

Further, the placement may include, in a case where the part is to be placed in a center area except for an edge portion of the virtual space, determining the first placement direction so that the connection direction of the one-direction part is a right direction, determining the first placement direction so that the connection direction of the two-direction I-shaped part is a left direction and the right direction, determining the first placement direction so that the connection direction of the two-direction L-shaped part includes at least the left direction, and determining the first placement direction so that the connection direction of the three-direction part includes at least the left direction and an up direction.

Based on the above, it is possible to lead the placement direction of a part in a center area of the virtual space in a direction intended by a designer.

Further, the placement may include, in a case where the part is to be placed in an upper edge area that is an upper edge portion of the virtual space and in a lower edge area that is a lower edge portion of the virtual space, determining the first placement direction of each of the parts having the plurality of connection directions so that the connection directions have a relationship where the connection directions are obtained by rotating the others by 180 degrees.

Based on the above, it is possible to facilitate a user operation for placing a part in an upper edge area and a lower edge area of the virtual space.

Further, the placement may include, in a case where the part is to be placed in a left edge area that is a left edge portion of the virtual space and in a right edge area that is a right edge portion of the virtual space, determining the first placement direction of each of the parts so that the parts have a relationship where the connection directions of the parts are obtained by horizontally flipping the others.

Based on the above, it is possible to facilitate a user operation for placing a part in a left edge area and a right edge area of the virtual space.

Further, the placement may include, in a case where the one-direction part is to be placed in a right edge area that is a right edge portion of the virtual space, determining the first placement direction so that the connection direction is a left direction, and in a case where the one-direction part is to be placed in an area except for the right edge area of the virtual space, determining the first placement direction so that the connection direction is a right direction.

Based on the above, it is possible to facilitate a user operation for placing a one-direction part in the virtual space.

Further, the placement may include, in a case where the two-direction I-shaped part is to be placed in, in a left edge portion and a right edge portion of the virtual space, a left and right edge center area obtained by excluding upper and lower edge portions, determining the first placement direction so that the connection direction is an up direction and a down direction, and in a case where the two-direction I-shaped part is to be placed in, in the left edge portion and the right edge portion of the virtual space, an area obtained by excluding the left and right edge center area of the virtual space, determining the first placement direction so that the connection direction is a left direction and a right direction.

Based on the above, it is possible to facilitate a user operation for placing a two-direction I-shaped part in the virtual space.

Further, the placement may include, in a case where the two-direction L-shaped part is to be placed in a corner portion area that is a corner portion of the virtual space, determining the first placement direction so that the connection direction is not directed from the corner portion of the virtual space toward outside the virtual space.

Based on the above, it is possible to facilitate a user operation for placing a two-direction L-shaped part in the virtual space.

Further, the placement may include, in a case where the three-direction part is to be placed in a center area that is not adjacent to an edge portion of the virtual space, determining the first placement direction so that the connection direction is a left direction, a down direction, and a right direction.

Based on the above, it is possible to facilitate a user operation for placing a three-direction part in the virtual space.

Further, the placement may include, in a case where the part is to be placed at a position adjacent to the one-direction part already placed in the virtual space, and if there is not another part that can be connected to the one-direction part in a direction other than a direction in which the part is placed among up, down, left, and right directions of the one-direction part, changing a placement direction of the one-direction part so that the one-direction part is connected to the part.

Based on the above, it is possible to further reduce the state where parts are not connected together.

Further, the exemplary embodiment may be carried out in the forms of an information processing apparatus, an information processing system, and an information processing method.

According to the exemplary embodiment, in a case where a part is placed in a virtual space in accordance with a/the user operation, a placement direction is determined in accordance with a placement position. Thus, it is possible to facilitate a user operation necessary/required to place the part.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 11 is a diagram showing non-limiting examples of the rules that, in accordance with a placement position in the virtual space, the placement direction rotates when a route part is initially placed;

FIG. 16 is a diagram showing non-limiting examples of exception rules in the route part placement direction change rules;

DETAILED DESCRIPTION OF NON-LIMITING EXAMPLE EMBODIMENTS

A game system according to an exemplary embodiment is described below. An example of a game system 1 according to the exemplary embodiment includes a main body apparatus (an information processing apparatus; which functions as a game apparatus main body in the exemplary embodiment) 2, and a left controller 3 and a right controller 4 and functions also as an information processing system. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
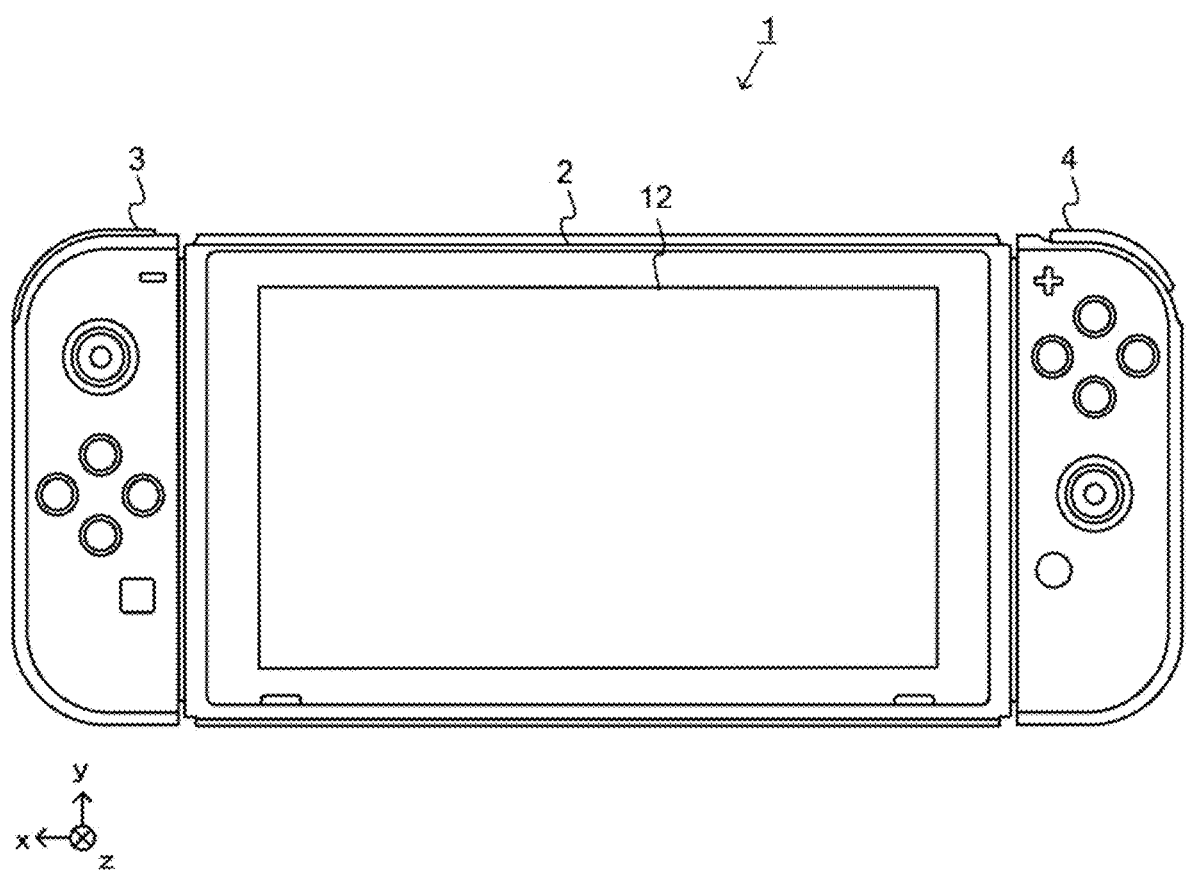
FIG. 1 is a diagram showing a non-limiting example of the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
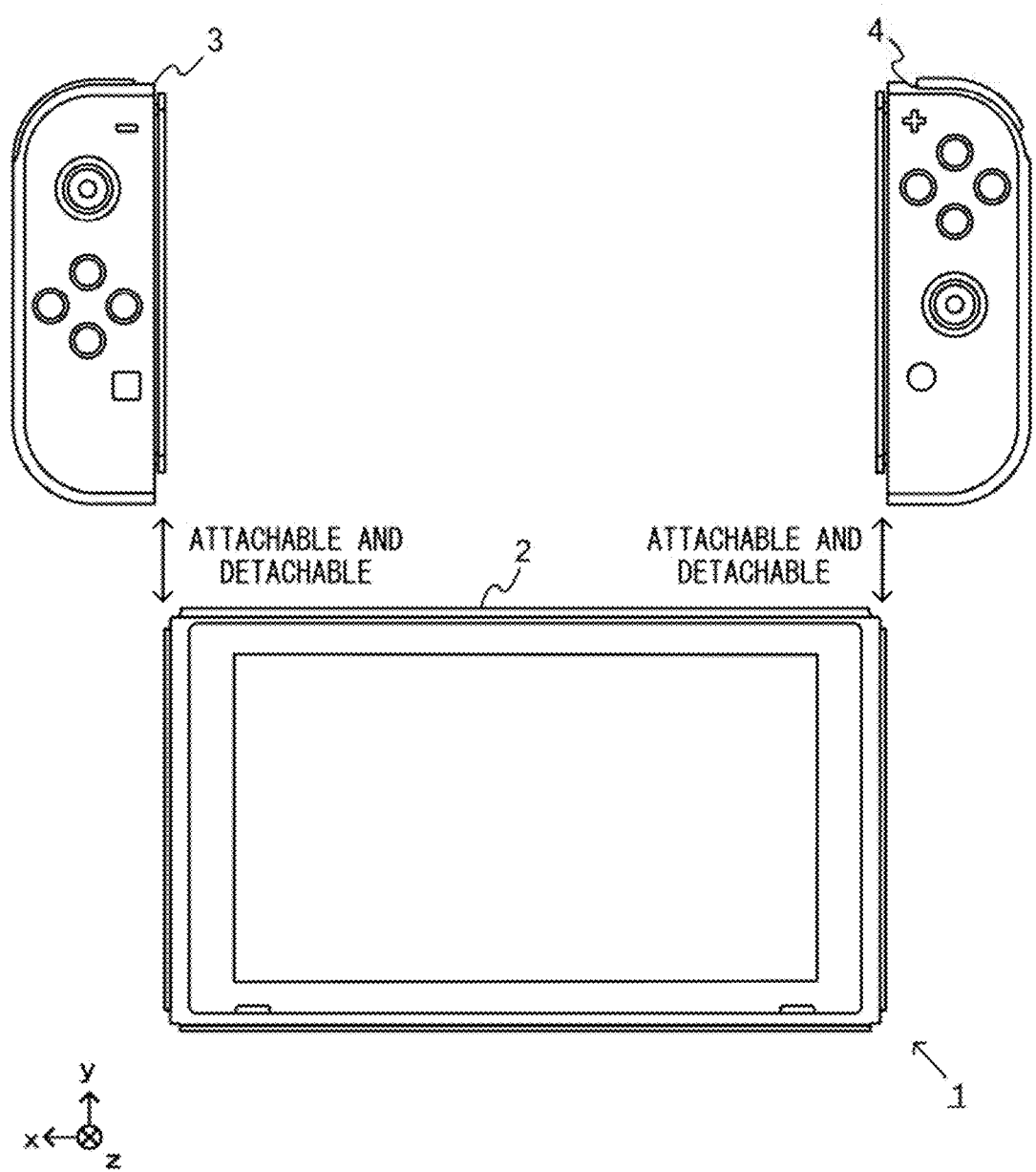
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
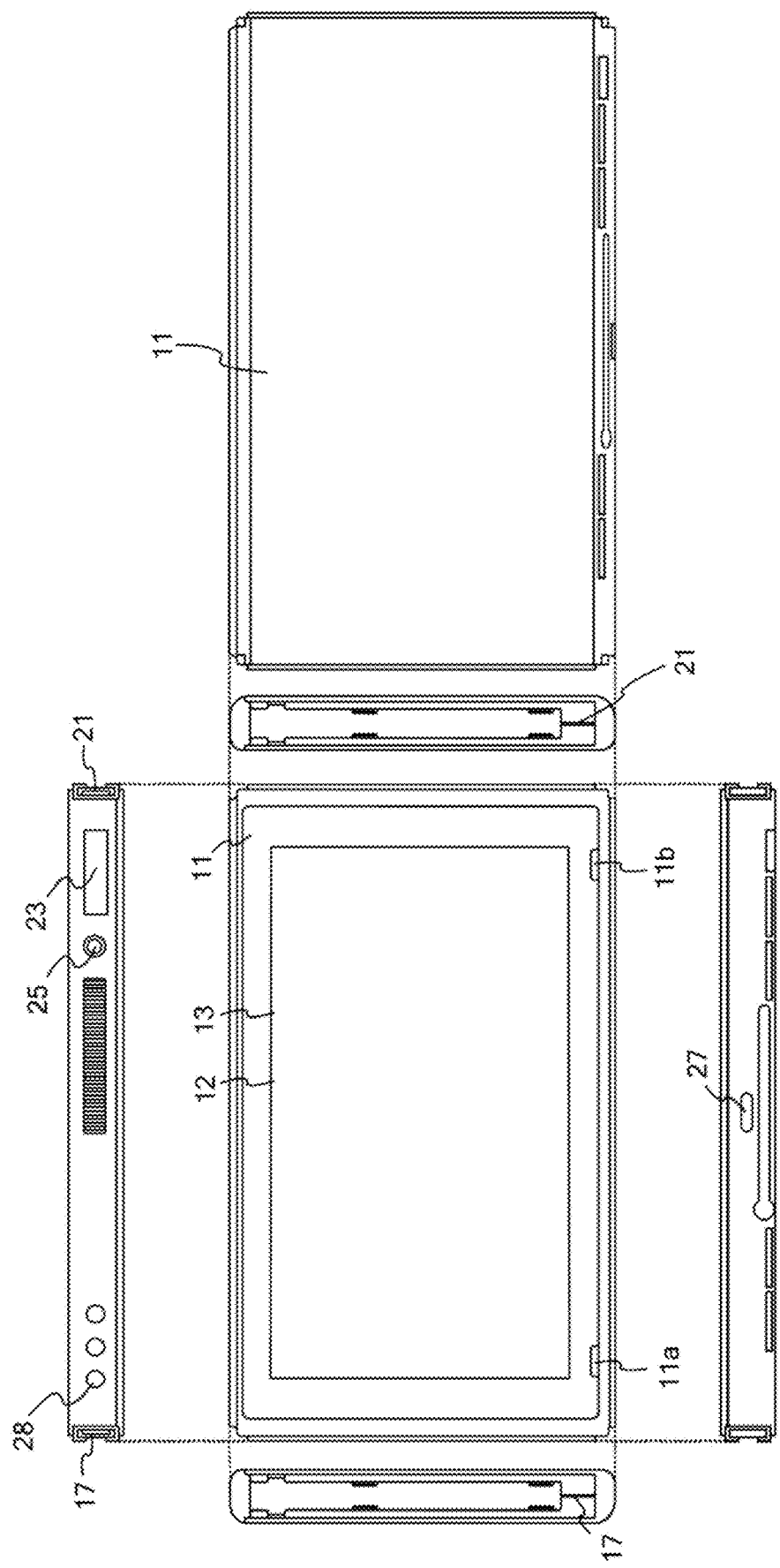
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
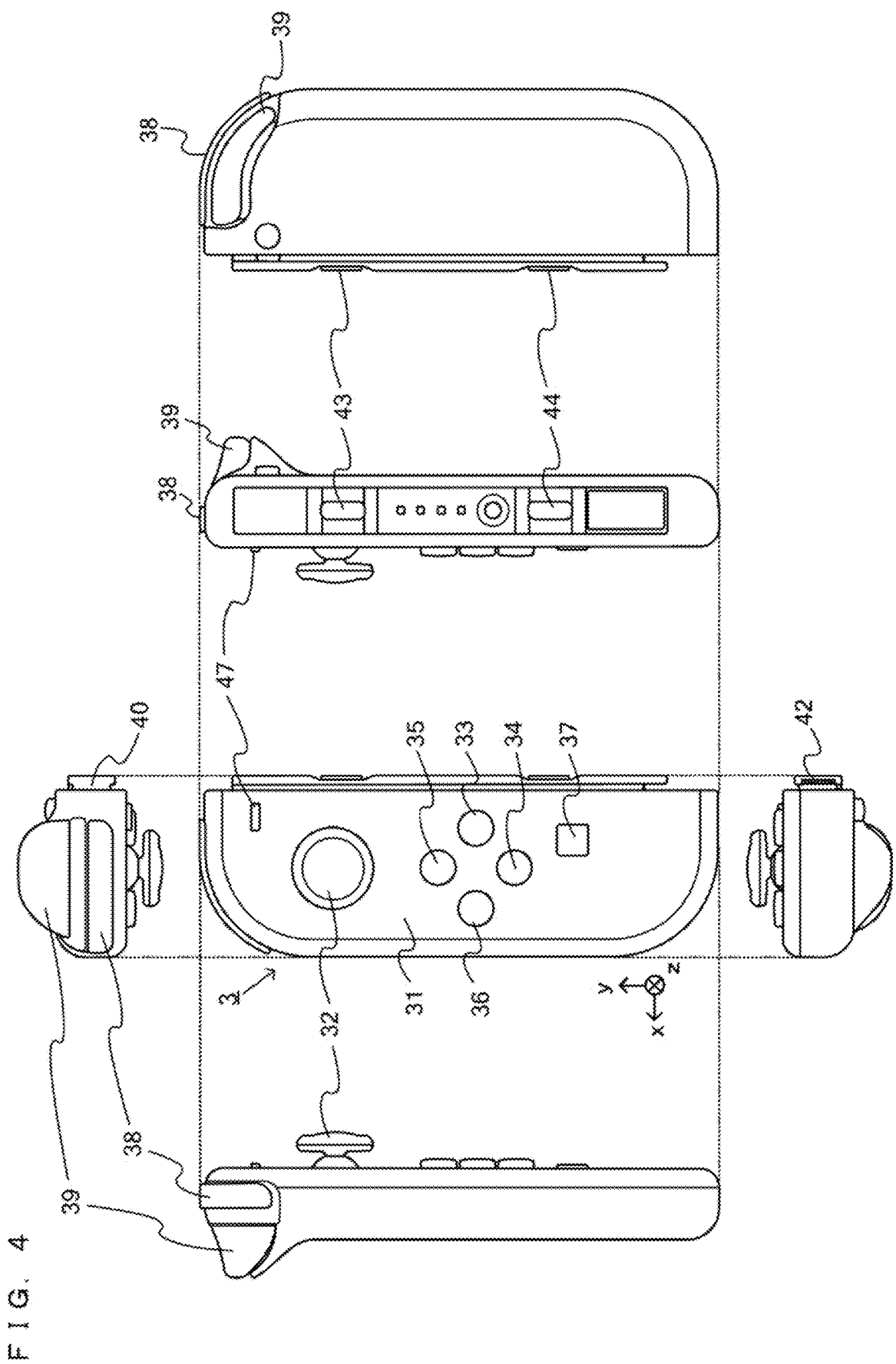
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
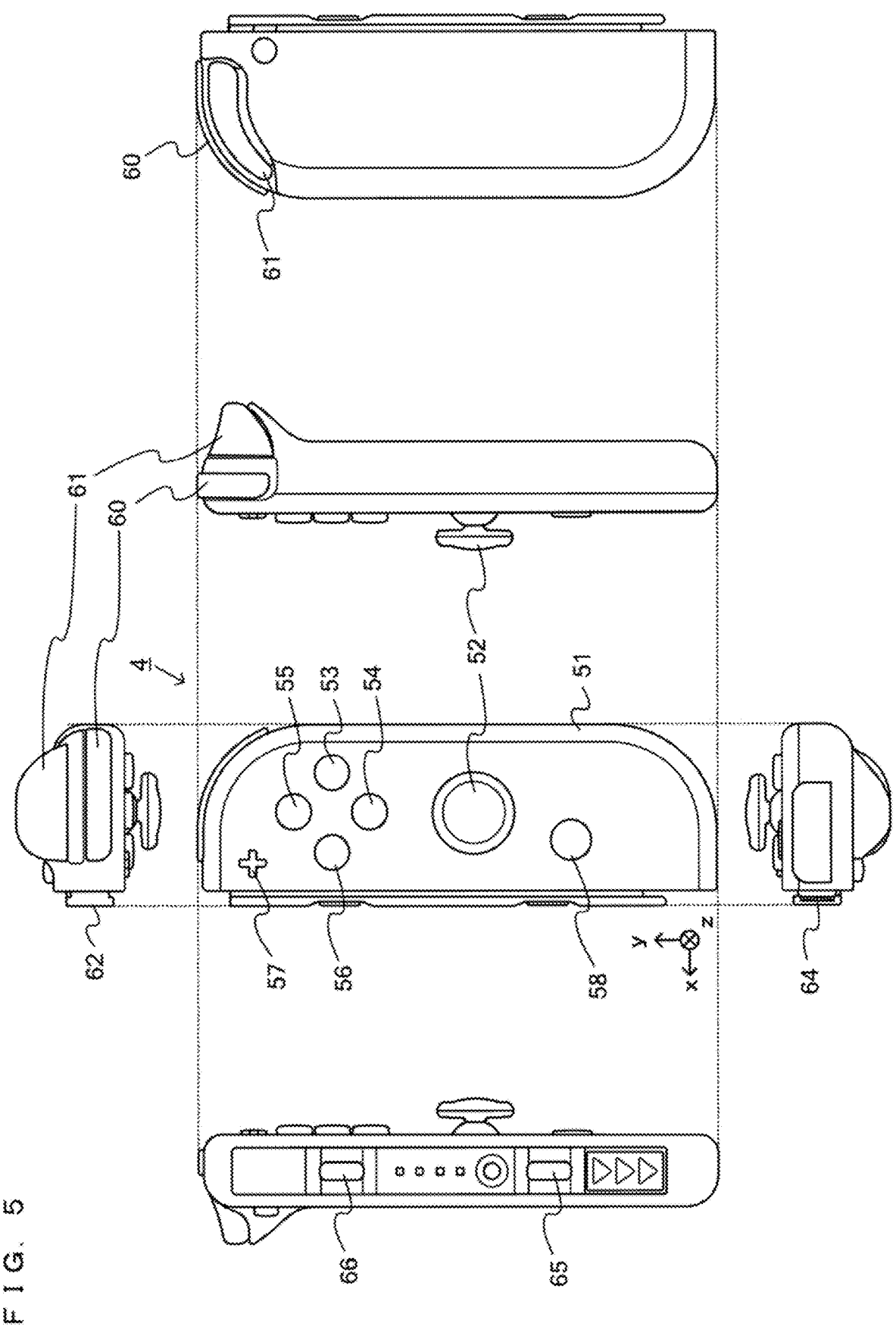
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
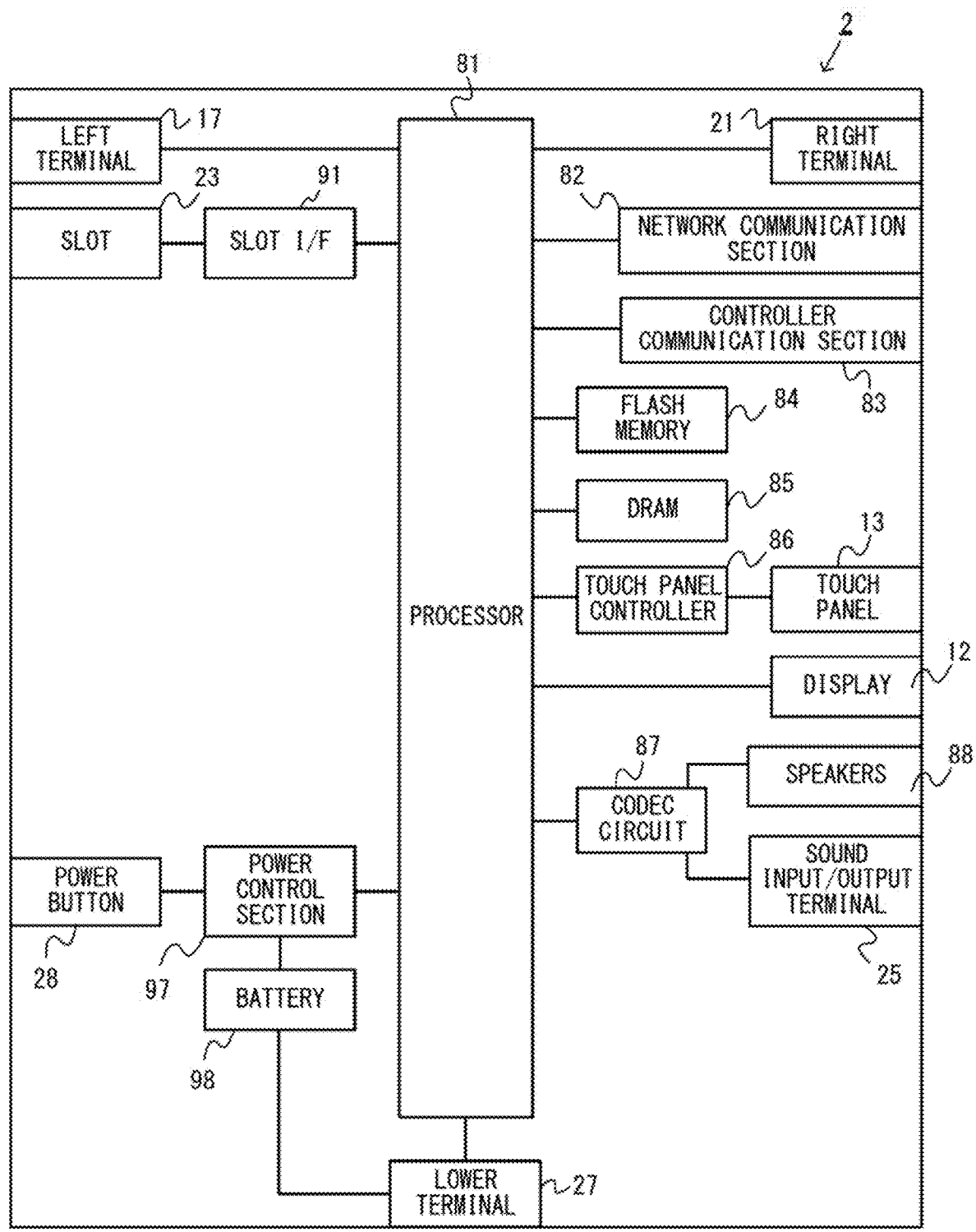
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
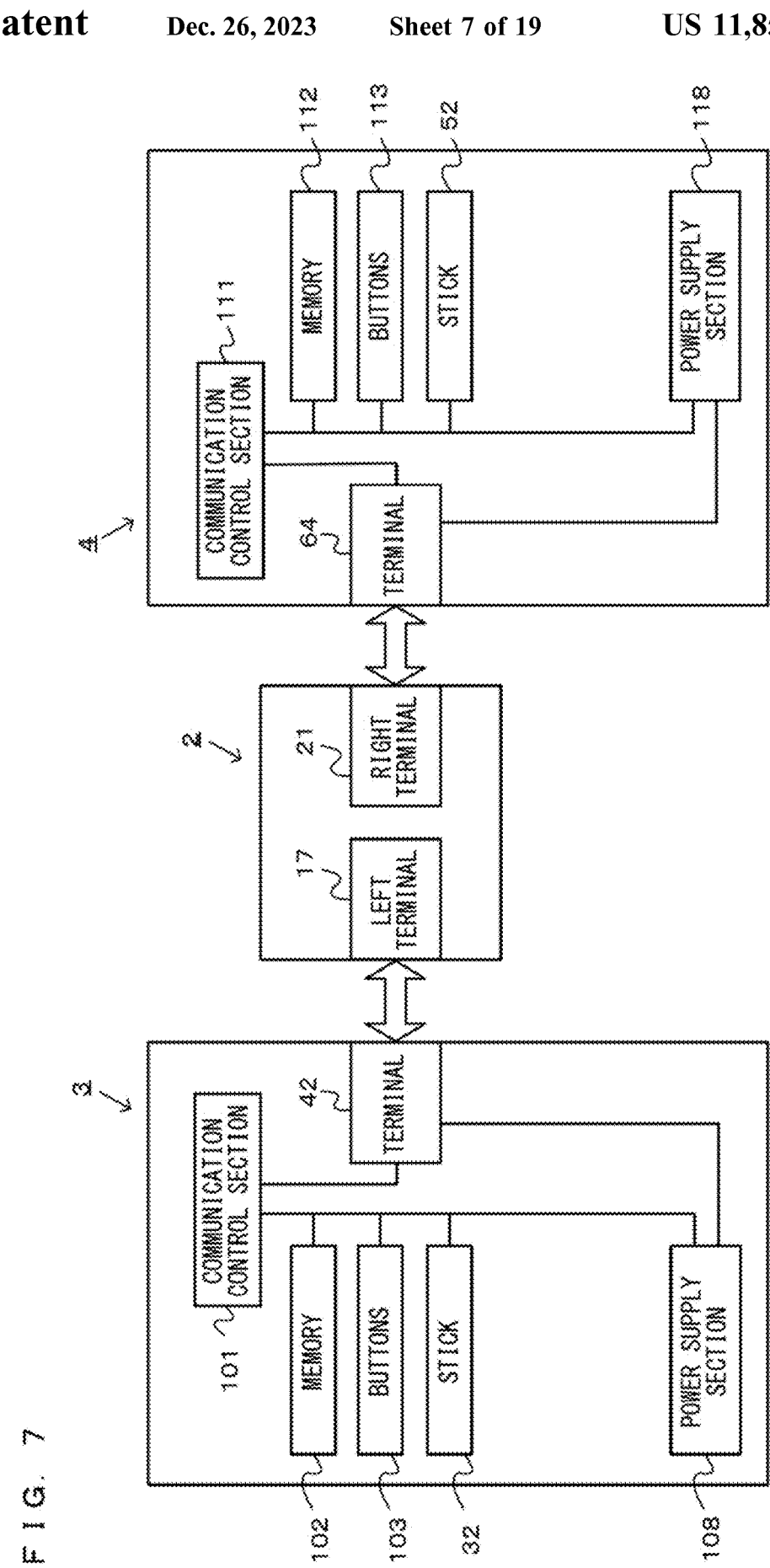
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a processing section 121. The processing section 121 is connected to the communication control section 111.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to an external display device such as the stationary monitor. A description is given below using the game system 1 in the use form of the unified apparatus obtained by attaching the left controller 3 and the right controller 4 to the main body apparatus 2.

As described above, in accordance with operations on the operation buttons and the sticks of the left controller 3 and/or the right controller 4 in the game system 1 as the unified apparatus, a touch operation on the touch panel 13 of the main body apparatus 2, or the operation of moving the entirety of the unified apparatus, a virtual space is generated or edited, or game play is performed using the virtual space. In the exemplary embodiment, as an example, in accordance with user operations using the above operation buttons, the above sticks, and the touch panel 13, route parts are placed in a virtual space displayed on the display 12, whereby it is possible to form a game world desired by a user in the virtual space. Further, in accordance with user operations using the above operation buttons, the above stick, and the touch panel 13, it is possible to perform game play using the formed game world.

Figures 8, 9:
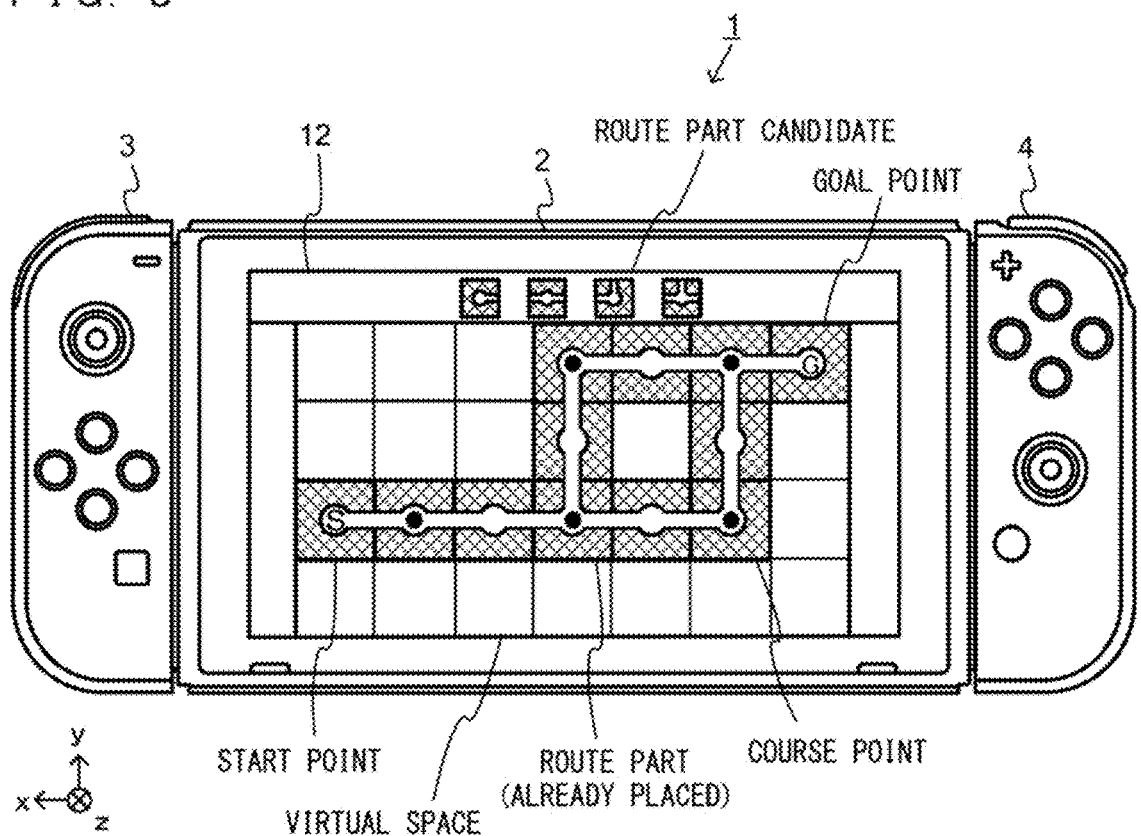
FIG. 8 is a diagram showing a non-limiting example of, in a game image displayed on a display 12 of the main body apparatus 2, representation for generating or editing a virtual space, thereby forming a game world.
FIG. 9 is a diagram showing non-limiting examples of placement areas in a virtual space.

With reference to FIG. 8, a description is given of an overview of game processing performed by the game system 1. FIG. 8 is a diagram showing an example of, in a game image displayed on the display 12 of the main body apparatus 2, representation for generating or editing a virtual space, thereby forming a game world. In the following description, a game is used as an example of an application executed by the game system 1. Alternatively, another application may be executed by the game system 1.

In FIG. 8, on the display 12 of the game system 1, a game image for generating or editing a game world to be used in a game played in the game system 1 is displayed. For example, the game world according to the exemplary embodiment is displayed by an image representing a route along which a player object that moves in accordance with a user operation can move from a movement start position (a start point; "S" in FIG. 8) to a reach target position (a goal point; "G" in FIG. 8). Specifically, as shown in FIG. 8, on the route from the start point to the goal point, a branch route can also be formed, and a course point (a black filled circle mark in FIG. 8) can also be set in the middle of the route. Here, the course point is a position as follows. The player object reaches this position, whereby a game using at least one game stage in a different virtual space from the game world can be played. Then, the game stage set at the course point is cleared, whereby the player object can pass through the course point and move toward the goal point along the route. Then, if the player object reaches the goal point in the game world, the game using the game world is cleared.

In the exemplary embodiment, a route in a game world provided in such a virtual space can be generated or edited in accordance with a user operation. For example, the entirety of a virtual space displayed on the display 12 is divided into a plurality of grid divisions (in the example of FIG. 8, grid divisions in four rows and seven columns). Then, a plurality of types of route parts that can be placed in each grid division are prepared. Any of the route parts is placed in each grid division, whereby it is possible to form a game world in the virtual space. In the exemplary embodiment, an example is used where the entirety of a virtual space is divided into square grid divisions of the same size, and square route parts that can be placed in the grid divisions are prepared.

Within each route part, a route image to be set in the game world is drawn. For example, in each route part, a part of a route to which the player object can move is drawn in a terrain (e.g., flatland, wasteland, underground, desert, forest, a snowfield, a sky, a sea, outer space, a volcano, or the like) to be formed on the game world. In the exemplary embodiment, as candidates for a route part that can be placed in the virtual space, four types of route parts, namely a one-direction part, a two-direction I-shaped part, a two-direction L-shaped part, and a three-direction part, are prepared. Specifically, the one-direction part is a route part in which a connection direction capable of connecting to another route part is set on one of the four sides of the square, and a dead end route is drawn. The two-direction I-shaped part is a route part in which the connection direction is set on two sides opposed to each other among the four sides of the square, and a straight line (I-shaped) route is drawn. The two-direction L-shaped part is a route part in which the connection direction is set on two sides adjacent to each other among the four sides of the square, and a route that turns at a right angle (is L-shaped) is drawn. Then, the three-direction part is a route part in which the connection direction is set on three of the four sides of the square, and a T-shaped route is drawn. In the exemplary embodiment, for ease of description, four types of route parts are used, but another route part may be prepared. For example, a route part in which a route is not drawn, a route part in which a curve route is drawn, a route part in which a cross road route is drawn, a route part in which routes different in height from each other are drawn, or the like may be further prepared.

The user can initially place a route part selected from the prepared route part candidates to match any of the grid divisions in the virtual space. Then, in route parts placed adjacent to each other, if the connection direction is set on both the sides of the others with which the route parts are in contact, i.e., if the sides on which the connection direction is set are joined together, the route parts are placed in the virtual space in the state where the routes drawn in the respective route parts are connected together. For example, as illustrated in FIG. 8, the one-direction part in which the start point is set and the connection direction is set on the right side (a route part placed in the grid division at the third row and the first column), and the two-direction I-shaped part which is adjacent on the right to the one-direction part and in which the connection direction is set on the left and right sides (a route part placed in the grid division at the third row and the second column) are adjacent to each other in the state where the sides of the route parts on which the connection direction is set are joined together. Thus, the route parts are placed as adjacent parts in which a route obtained by linking the routes of the route parts in a left-right direction is drawn.

The placement position and the placement direction of a route part selected by the user are also set by a user operation. For example, by a touch operation for dragging and dropping a route part subjected to a touch-on operation by a touch operation using the touch panel 13, the user can place the route part at the position of a grid division desired by the user. By a touch operation for tapping the route part after the placement or the operation of pressing a predetermined operation button, the user rotates the route part by 90 degrees each time in a predetermined direction (e.g., a clockwise direction) and thereby can change the placement direction of the route part.

To the inside of a route part placed in the virtual space, a point part having a predetermined function can be added in accordance with a user operation. Specifically, near the center of a route part, an empty space to which a point part can be added is provided in the middle of the route. If a point part is added to the route part, a sign indicating the point part is displayed in the empty space. As an example, in a case where a start point indicating the point of origin of a route is added as a point part, an "S" sign indicating the start point is displayed in the empty space. In a case where a goal point indicating the terminal point of a route is added as a point part, a "G" sign indicating the goal point is displayed in the empty space. In a case where a course point indicating that a game stage is set is added as a point part, a "black filled circle mark" sign indicating the course point is displayed in the empty space.

Here, in the exemplary embodiment, there is a rule that a route where the player object cannot reach the goal point from the start point is not formed (not displayed). Thus, even if the user forms such a route when generating or editing a route, but when play is performed using the route after the route is finalized, the route is erased, and the player object cannot move. As an example, in the exemplary embodiment, the range displayed on the display 12 is the entirety of a virtual space where a game world can be formed, and a route from an edge portion to the outside of the virtual space is erased when the above play is performed. As another example, in the virtual space, a route that is a dead end at a position other than the point of origin (the start point) and the terminal point (the goal point) of the route is erased when the above play is performed. In the exemplary embodiment, in a case where a route part is placed and/or moved, the placement direction of the route part is automatically changed to minimize such routes to be erased when play is performed.

Figure 10:
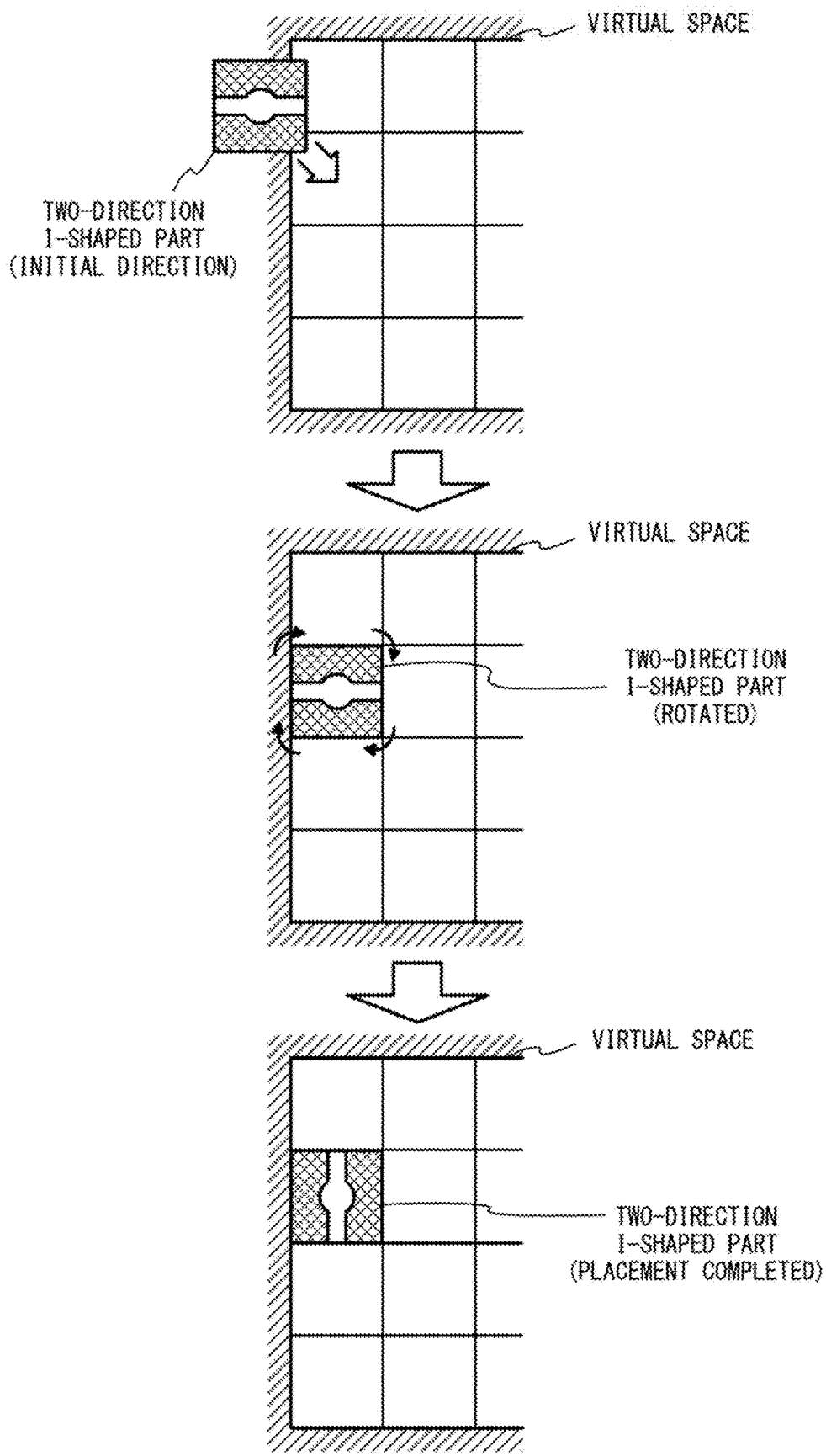
FIG. 10 is a diagram showing a non-limiting example where a placement direction is changed in a case where a two-direction I-shaped part is initially placed in a center left edge area.

With reference to FIGS. 9 to 11, as an example where the placement direction of a route part is automatically changed, an example is described where, in accordance with the placement position in a virtual space where a route part is placed, the placement direction when the route part is initially placed is automatically changed. FIG. 9 is a diagram showing examples of placement areas in the virtual space. FIG. 10 is a diagram showing an example where the placement direction is changed in a case where the two-direction I-shaped part is initially placed in a center left edge area. FIG. 11 is a diagram showing examples of the rules that, in accordance with the placement position in the virtual space, the placement direction rotates when a route part is initially placed.

In FIG. 9, in the exemplary embodiment, the entirety of a virtual space where a game world can be formed is displayed on the display 12. As an example, the entirety of a virtual space displayed on the display 12 is managed by being divided into square grid divisions in four rows and seven columns. To make the description specific, the entirety of the virtual space displayed on the display 12 is divided into a total of 28 square grid divisions, namely four rows 1 to 4 from an upper edge to a lower edge of the virtual space and seven columns 1 to 7 from a left edge to a right edge of the virtual space.

For example, in the entirety of the virtual space, an area that does not belong to edge portions (the upper edge, the lower edge, the left edge, and the right edge) as the boundaries with the outside of the virtual space (in the example of FIG. 9, the total of ten grid divisions obtained by excluding the grid divisions in the column 1, which is the first column from the left edge, and the grid divisions in the column 7, which is the first column from the right edge, among the grid divisions belonging to the row 2, which is the second row from the upper edge, and the grid divisions belonging to the row 3, which is the third row from the upper edge) is defined a "center area". In the entirety of the virtual space, an area belonging to the upper edge and the left edge, which is the upper left corner of the virtual space (in the example of FIG. 9, the grid division at the corner located in the row 1, which is the first row from the upper edge, and the column 1, which is the first column from the left edge), is defined as an "upper left corner area". In the entirety of the virtual space, an area belonging to the upper edge and the right edge, which is the upper right corner of the virtual space (in the example of FIG. 9, the grid division at the corner located in the row 1, which is the first row from the upper edge, and the column 7, which is the first column from the right edge), is defined as an "upper right corner area". In the entirety of the virtual space, an area belonging to the lower edge and the left edge, which is the lower left corner of the virtual space (in the example of FIG. 9, the grid division at the corner located in the row 4, which is the first row from the lower edge, and the column 1, which is the first column from the left edge), is defined as a "lower left corner area". In the entirety of the virtual space, an area belonging to the lower edge and the right edge, which is the lower right corner of the virtual space (in the example of FIG. 9, the grid division at the corner located in the row 4, which is the first row from the lower edge, and the column 7, which is the first column from the right edge), is defined as a "lower right corner area". In the entirety of the virtual space, an area obtained by excluding the "upper left corner area" and the "upper right corner area" from an area belonging to the upper edge of the virtual space (in the example of FIG. 9, the total of five grid divisions located in the row 1, which is the first row from the upper edge, and the column 2, which is the second column from the left edge, to the column 6, which is the sixth column from the left edge) is defined as a "center upper edge area". In the entirety of the virtual space, an area obtained by excluding the "lower left corner area" and the "lower right corner area" from an area belonging to the lower edge of the virtual space (in the example of FIG. 9, the total of five grid divisions located in the row 4, which is the first row from the lower edge, and the column 2, which is the second column from the left edge, to the column 6, which is the sixth column from the left edge) is defined as a "center lower edge area". In the entirety of the virtual space, an area obtained by excluding the "upper left corner area" and the "lower left corner area" from an area belonging to the left edge of the virtual space (in the example of FIG. 9, the total of two grid divisions located in the row 2, which is the second row from the upper edge, and the row 3, which is the third row from the upper edge, and the column 1, which is the first column from the left edge) is defined as a "center left edge area". In the entirety of the virtual space, an area obtained by excluding the "upper right corner area" and the "lower right corner area" from an area belonging to the right edge of the virtual space (in the example of FIG. 9, the total of two grid divisions located in the row 2, which is the second row from the upper edge, and the row 3, which is the third row from the upper edge, and the column 7, which is the first column from the right edge) is defined as a "center right edge area".

In the virtual space classified into such a plurality of areas, in a case where a route part is initially placed in an area except for the "center area" in accordance with a user operation, the route part may be placed by automatically rotating from the placement direction before the initial placement (an initial direction; corresponding to an example of a first placement direction). For example, as shown in FIG. 10, for the two-direction I-shaped part, as the initial direction that is the placement direction before the two-direction I-shaped part is initially placed, the direction in which a route in the left-right direction is drawn (i.e., the direction in which a connection direction capable of making a route connection to an adjacent part is set on each of the left side and the right side of the route part) is set in advance. Then, in a case where the two-direction I-shaped part is initially placed in the "center left edge area" of the virtual space, the two-direction I-shaped part in which the route in the left-right direction is drawn is placed by rotating by 90 degrees clockwise in the direction in which a route in an up-down direction is drawn. The placement direction of such a route part rotates, whereby a route from the "center left edge area" of the virtual space toward outside the virtual space (the left side outside the virtual space) is not set. Thus, it is possible to prevent the formation of an unnecessary route along which the player object cannot move.

With reference to FIG. 11, a description is given of an example of the placement direction of a route part initially placed in each area. As described above, for each route part, the initial direction that is the placement direction before the route part is initially placed is set. As an example, as the initial direction of the one-direction part, the direction in which a route from a dead end point to a right direction is drawn (i.e., the direction in which the connection direction is set on the right side of the route part) is set. As the initial direction of the two-direction I-shaped part, the direction in which a route in the left-right direction is drawn (i.e., the direction in which the connection direction is set on each of the left side and the right side of the route part) is set. As the initial direction of the two-direction L-shaped part, the direction in which a route from a left direction turns in an up direction is drawn (i.e., the direction in which the connection direction is set on each of the left side and the upper side of the route part) is set. Then, as the initial direction of the three-direction part, the direction in which a route in the left-right direction and a route from the up direction intersects the middle of the route is drawn (i.e., the direction in which the connection direction is set on each of the left side, the right side, and the upper side of the route part) is set.

In a case where each route part is initially placed in the "center area" of the virtual space, the route part is initially placed in the placement direction obtained by using the above initial direction as it is. Also in a case where each route part is initially placed in the "center lower edge area" of the virtual space, the route part is initially placed in the placement direction obtained by using the above initial direction as it is.

In a case where each route part is initially placed in the "center upper edge area" of the virtual space, the route parts having a plurality of connection directions are initially placed in the placement direction obtained by rotating the above initial direction by 180 degrees, and the one-direction part is initially placed in the placement direction obtained by using the above initial direction as it is.

In a case where each route part is initially placed in the "center left edge area" of the virtual space, the route parts having a plurality of connection directions are initially placed in the placement direction obtained by rotating the above initial direction by 90 degrees clockwise, and the one-direction part is initially placed in the placement direction obtained by using the above initial direction as it is. Then, in a case where each route part is initially placed in the "center right edge area" of the virtual space, the route part is initially placed in the placement direction obtained by horizontally flipping the placement direction in which the route part is initially placed in the "center left edge area".

In the four corner areas, each route part is initially placed in the following placement direction. In a case where the one-direction part is initially placed in the "upper left corner area" and the "lower left corner area", the one-direction part is initially placed in the placement direction obtained by using the above initial direction as it is. In a case where the one-direction part is initially placed in the "upper right corner area" and the "lower right corner area", the one-direction part is initially placed in the placement direction obtained by rotating the above initial direction by 180 degrees. In any of the cases where the two-direction I-shaped part is initially placed in the "upper left corner area", the "upper right corner area", the "lower left corner area", and the "lower right corner area", the two-direction I-shaped part is initially placed in the placement direction obtained by using the above initial direction as it is. In a case where the two-direction L-shaped part is initially placed in the "upper left corner area", the two-direction L-shaped part is initially placed in the placement direction in which the connection direction is set on each of the right side and the lower side of the route part. In a case where the two-direction L-shaped part is initially placed in the "upper right corner area", the two-direction L-shaped part is initially placed in the placement direction in which the connection direction is set on each of the left side and the lower side of the route part. In a case where the two-direction L-shaped part is initially placed in the "lower left corner area", the two-direction L-shaped part is initially placed in the placement direction in which the connection direction is set on each of the right side and the upper side of the route part. In a case where the two-direction L-shaped part is initially placed in the "lower right corner area", the two-direction L-shaped part is initially placed in the placement direction in which the connection direction is set on each of the left side and the upper side of the route part. Then, in a case where the three-direction part is initially placed in the "lower left corner area" and the "lower right corner area", the three-direction part is initially placed in the placement direction obtained by using the above initial direction as it is. In a case where the three-direction part is initially placed in the "upper left corner area" and the "upper right corner area", the three-direction part is initially placed in the placement direction obtained by rotating the above initial direction by 180 degrees.

Thus, in a case where each route part is initially placed in the "upper right corner area", the route part is initially placed in the placement direction obtained by horizontally flipping the placement direction in which the route part is initially placed in the "upper left corner area". In a case where each route part is initially placed in the "lower left corner area", the route part is initially placed in the placement direction obtained by vertically flipping the placement direction in which the route part is initially placed in the "upper left corner area" (the placement direction obtained by rotating by 180 degrees the placement direction in which the route part is initially placed in the "upper right corner area"). Then, in a case where each route part is initially placed in the "lower right corner area", the route part is initially placed in the placement direction obtained by vertically flipping the placement direction in which the route part is initially placed in the "upper right corner area" (the placement direction obtained by horizontally flipping the placement direction in which the route part is initially placed in the "lower left corner area").

As described above, in a case where each route part is initially placed in the virtual space in accordance with a user operation, the placement direction is initialized by rotating to minimize the number of routes from an edge portion of the virtual space toward outside the virtual space. Specifically, in a case where the one-direction part is initially placed in the areas belonging to the right edge of the virtual space (the "center right edge area", the "upper right corner area", and the "lower right corner area"), the one-direction part is initially placed in the placement direction obtained by horizontally flipping the initial direction. In a case where the one-direction part is initially placed in the other areas, the one-direction part is initially placed in the initial direction as it is. In a case where the two-direction I-shaped part is initially placed in the "center left edge area" and the "center right edge area", the two-direction I-shaped part is initially placed in the placement direction obtained by rotating the initial direction by 90 degrees. In a case where the two-direction I-shaped part is initially placed in the other areas, the two-direction I-shaped part is initially placed in the initial direction as it is. In a case where the two-direction L-shaped part is initially placed in the four corner areas of the virtual space, the two-direction L-shaped part is initially placed in the placement direction in which the shape of the turning route drawn in the route part matches the shapes of the corners of the virtual space. Then, in a case where the three-direction part is initially placed in the areas belonging to the edge portions of the virtual space except for the corner areas (the "center upper edge area", the "center lower edge area", the "center left edge area", and the "center right edge area"), the three-direction part is initially placed in the placement direction in which the shape of the straight line route connecting to the two sides opposed to each other and drawn in the route part matches the shapes of the edges of the virtual space. In a case where the three-direction part is initially placed in the corner areas of the virtual space, the three-direction part is initially placed in the placement direction in which the shape of the straight line route connecting to the two sides opposed to each other and drawn in the route part matches the shapes of the upper edge and the lower edge of the virtual space.

Figure 12:
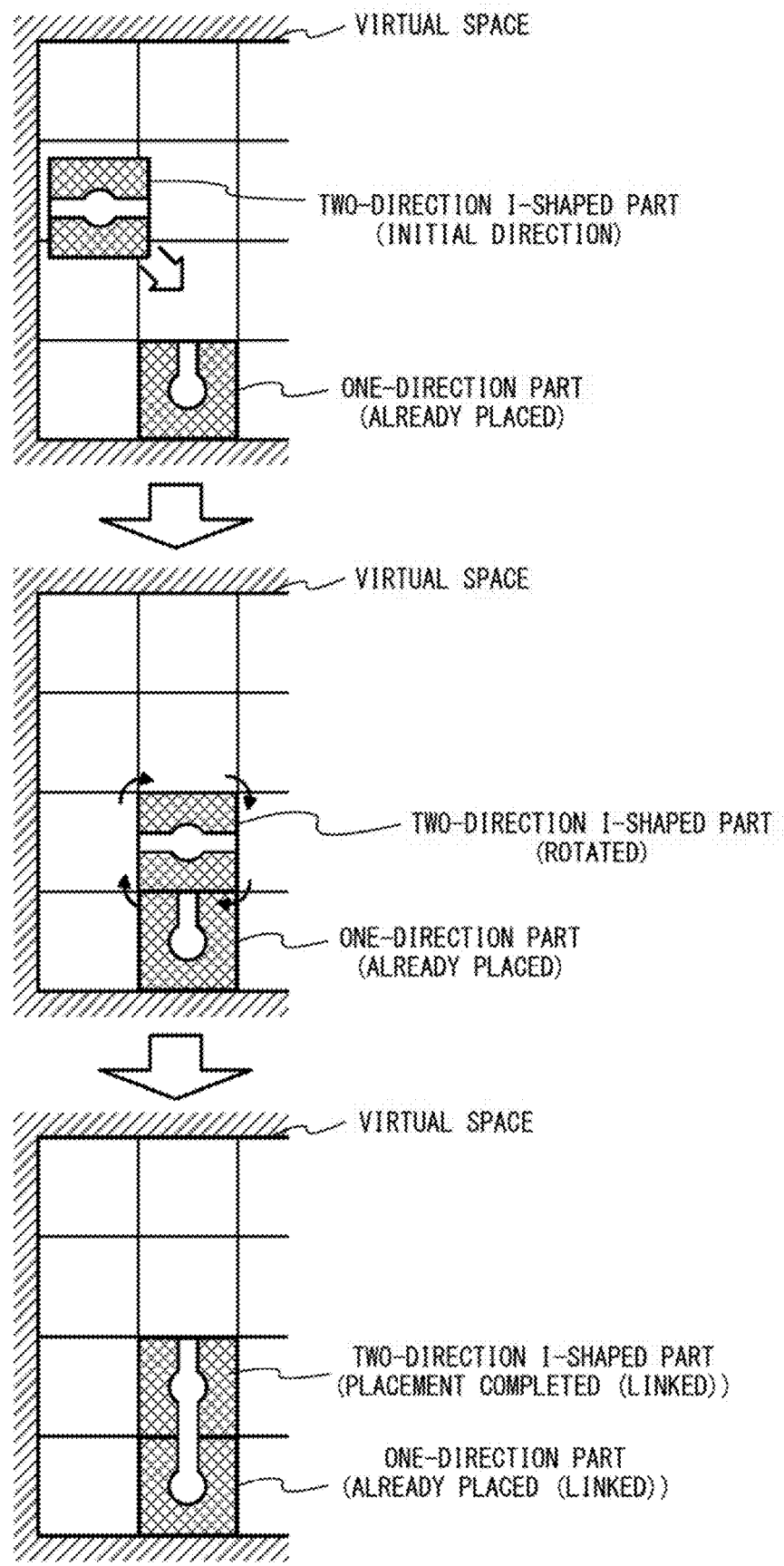
FIG. 12 is a diagram showing a non-limiting example where, in a case where the two-direction I-shaped part is initially placed adjacent to an already placed one-direction part, the placement direction is changed.

With reference to FIG. 12, as an example where the placement direction of a route part is automatically changed, an example is described where, when a route part is placed in the virtual space, the placement direction is automatically changed in accordance with the connection relationship between the route part and another route part adjacent to the route part. FIG. 12 is a diagram showing an example where, in a case where the two-direction I-shaped part is initially placed adjacent to the already placed one-direction part, the placement direction is changed.

In a case where a new route part is initially placed adjacent to another route part that is already placed in the virtual space in accordance with a user operation, the new route part may be placed by automatically rotating from the initial direction. For example, as shown in FIG. 12, the one-direction part in which the up direction is the connection direction is already placed in the virtual space. Then, for the two-direction I-shaped part to be newly initially placed, as described above, as the initial direction, the direction in which the route in the left-right direction is drawn (i.e., the direction in which the connection direction is set on the left side and the right side of the route part) is set in advance. Then, in a case where the two-direction I-shaped part is initially placed adjacent to the upper side of the already placed one-direction part, the two-direction I-shaped part rotates by 90 degrees clockwise and is placed such that the connection directions of both route parts (i.e., the connection direction set on the upper side of the one-direction part and the connection direction set on the lower side of the two-direction I-shaped part) overlap each other. The placement direction of the two-direction I-shaped part thus rotates, whereby the connection directions of the adjacent route parts overlap each other. Thus, the routes of the adjacent route parts are linked together, and the player object can move through the route of the one-direction part and through the route of the two-direction I-shaped part. Thus, as compared with a case where the two-direction I-shaped part is initially placed without the above rotation, it is possible to prevent the setting of a dead end route on the route of the one-direction part and/or the route of the two-direction I-shaped part in the virtual space as much as possible. Thus, it is possible to prevent the formation of an unnecessary route along which the player object cannot move. As described above, in a case where routes are linked together between route parts, it is possible to produce an effect in the game in which the player object can move between the route parts, and in a case where routes are not linked together between route parts, the player object cannot move between the route parts, and therefore, it is not possible to produce the effect in the game.

As will be clear from the following description, when a new route part is initially placed adjacent to a plurality of already placed route parts in the virtual space, and in a case where there are a plurality of connection direction candidates between the new route part and the plurality of route parts, the new route part may be initially placed in the placement direction in which the greatest number of routes can be linked to the route of the new route part. In a case where there are a plurality of candidates for the placement direction in which the greatest number of routes can be linked to the route of the new route part, a candidate for the placement direction reached first by rotating from the currently set placement direction in a predetermined direction (e.g., clockwise) may be selected as the placement direction in which the new route part is initially placed.

In a case where a new route part is initially placed adjacent to an already placed route part in the virtual space, the already placed route part may be rotated. For example, only in a case where a particular route part (e.g., the one-direction part) is already placed in the virtual space in the state where the route of the particular route part is not linked to the route of another route part, based on the relationship between the connection directions of the particular route part and a route part to be newly initially placed adjacent to the particular route part, the particular route part may be rotated.

Figure 13:
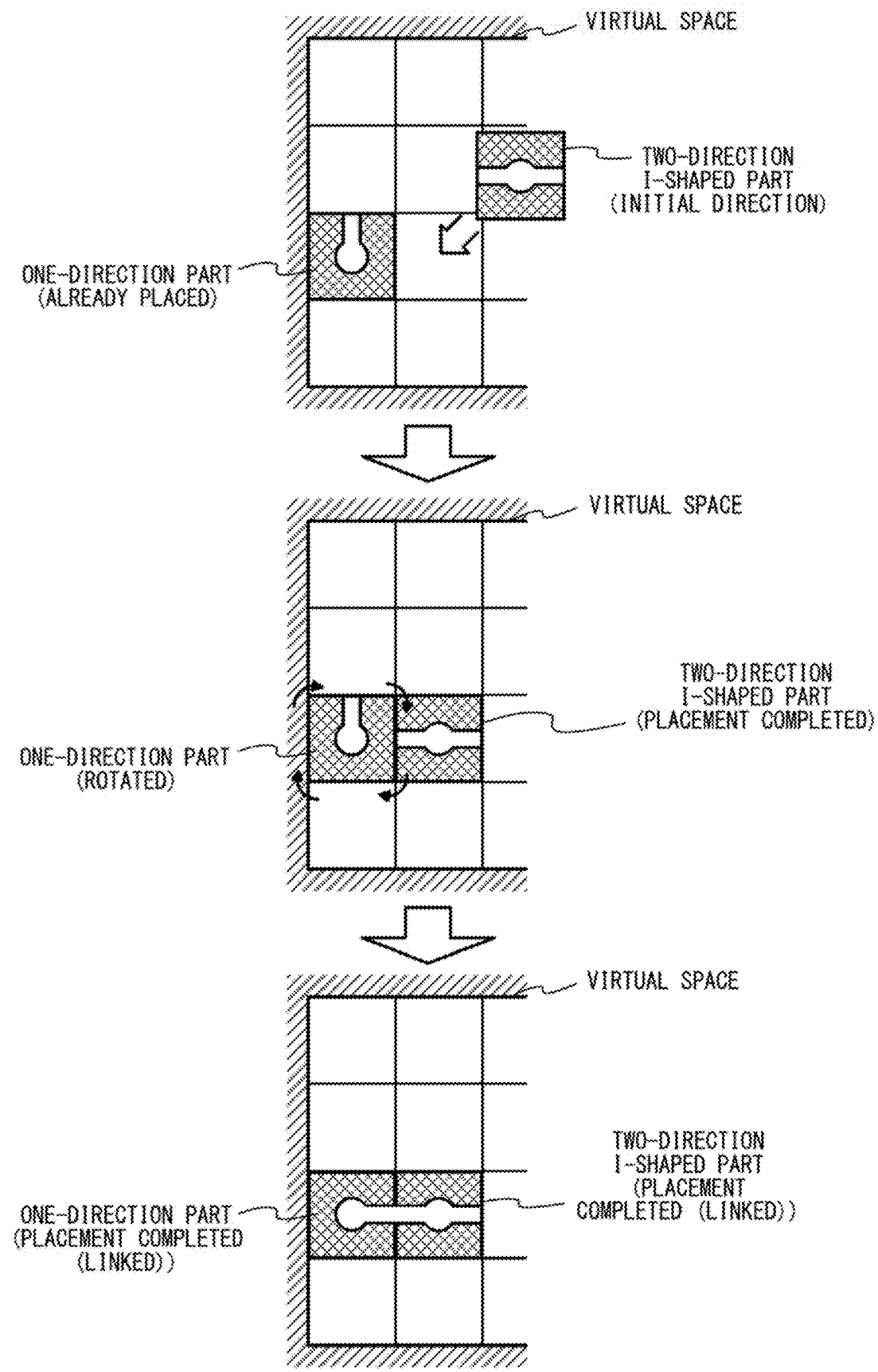
FIG. 13 is a diagram illustrating a non-limiting example where based on the relationship between connection directions of a particular route part and a route part to be newly initially placed adjacent to the particular route part, the particular route part is rotated.

With reference to FIG. 13, an example is described where, based on the relationship between the connection directions of a particular route part and a route part to be newly initially placed adjacent to the particular route part, the particular route part is rotated. As an example, as the particular route part, the one-direction part in which the connection direction is the up direction is placed in the virtual space in the state where the route of the one-direction part is not linked to the route of another route part. Then, a case is considered where the two-direction I-shaped part to be newly initially placed is initially placed to the right side of the already placed one-direction part using the initial direction (i.e., the direction in which the connection direction is set on the left side and the right side of the route part) as the placement direction. In this case, the already placed one-direction part rotates by 90 degrees clockwise so that the connection directions of both route parts (i.e., the connection direction set on the right side of the one-direction part and the connection direction set on the left side of the two-direction I-shaped part) overlap each other. The already placed one-direction part thus rotates, whereby the connection direction of the route part to be newly initially placed adjacent to the already placed one-direction overlaps the connection direction of the already placed one-direction. Thus, the routes of the adjacent route parts are linked together, and the player object can move through the route of the one-direction part and through the route of the two-direction I-shaped part. Thus, as compared with a case where the one-direction part is fixed without the above rotation, it is possible to prevent the setting of a dead end route on the route of the one-direction part and/or the route of the two-direction I-shaped part in the virtual space as much as possible. Thus, it is possible to prevent the formation of an unnecessary route along which the player object cannot move. The type of a route part that can rotate after being placed in the virtual space may be limited to at least one particular route part (e.g., limited to the one-direction part), or all types of route parts may be rotatable.

When a route part is placed in the virtual space, and in a case where a dead end or a movement-impossible route through which the player object cannot pass is formed, a map image may be displayed by changing the display form of the movement-impossible route to a display form different from that of a route (a movement-possible route) through which the player object can move.

Figure 14:
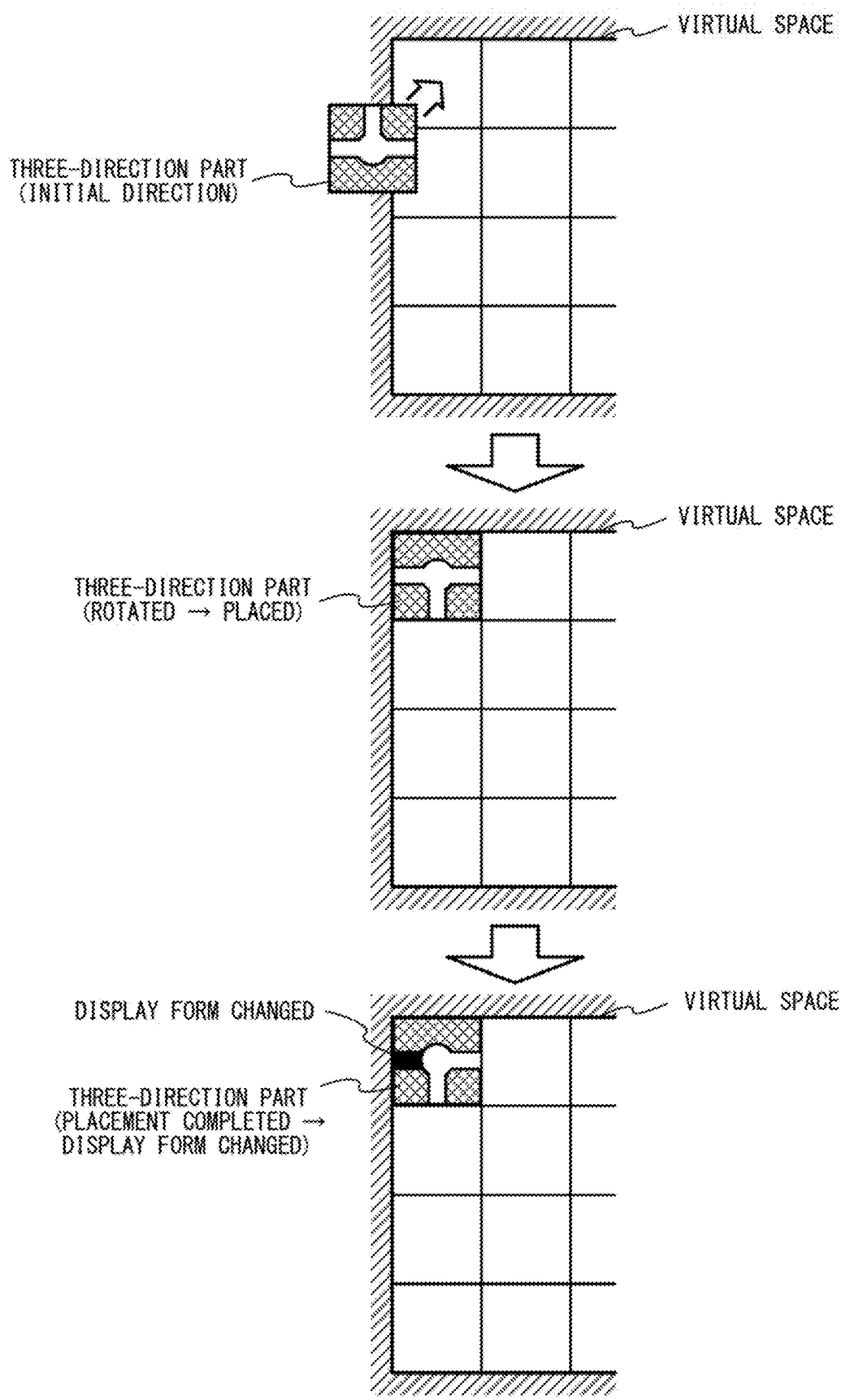
FIG. 14 is a diagram showing a non-limiting example of a map image in which a movement-possible route and a movement-impossible route are displayed in different display forms.
Figure 15:
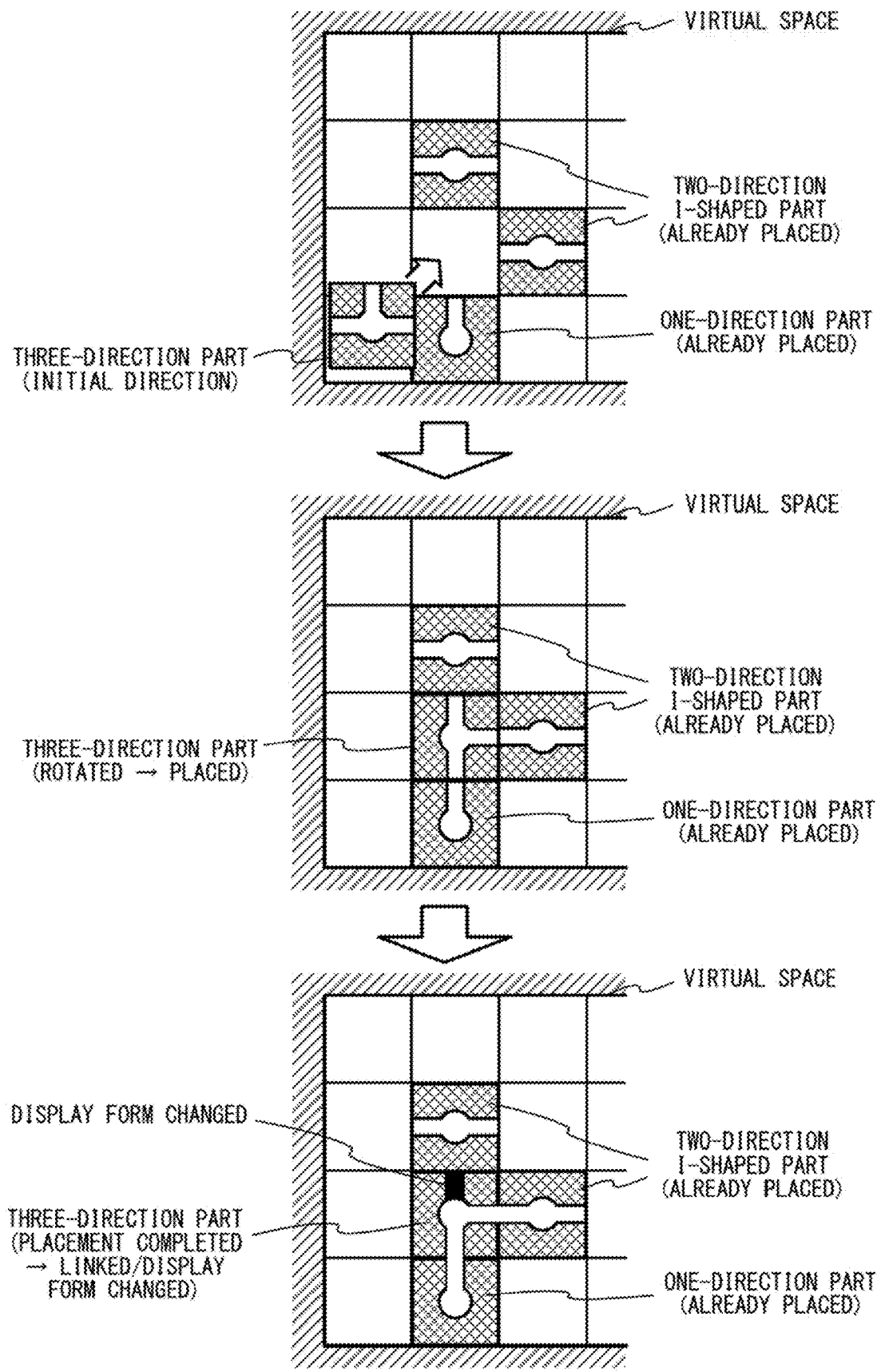
FIG. 15 is a diagram showing a non-limiting example of a map image in which a movement-possible route and a movement-impossible route are displayed in different display forms.

With reference to FIGS. 14 and 15, a description is given of an example of a map image in which a movement-possible route and a movement-impossible route are displayed in different display forms. For example, as illustrated in FIG. 14, in accordance with the placement position in the virtual space where a route part is placed, even if the placement direction in which the route part is initially placed is automatically changed, a movement-impossible route toward outside the virtual space can also be formed. As an example, for the three-direction part, as the initial direction, the direction in which the connection direction is set on each of the left side, the right side, and the upper side of the route part is set in advance. Then, in a case where the three-direction part is initially placed in the "upper left corner area" of the virtual space, the three-direction part is initially placed by rotating by 180 degrees so that the connection direction is set on each of the left side, the right side, and the lower side. Consequently, a route extending from the three-direction part initially placed in the "upper left corner area" toward outside the virtual space in the left direction is formed as a movement-impossible route. In a case where the movement-impossible route extending toward outside the virtual space is thus formed, in the routes drawn in the route part, the display form of an area corresponding to the movement-impossible route changes to a display form (e.g., a black filled display form in the example shown in FIG. 14) different from that of an area of another route. Consequently, the user who is generating or editing a route in the game world in the virtual space can know from the map image that a route is formed through which the player object cannot pass after the completion of the route.

As illustrated in FIG. 15, even if the placement direction of a route part to be newly placed is automatically changed in accordance with an already placed route part adjacent to the route part, a movement-impossible route can also be formed between the route part and the already placed route part. As an example, a case is considered where the two-direction I-shaped part in which the connection direction is set on the left side and the right side is already placed in each of the up direction and the right direction of the three-direction part to be initially placed, and the one-direction part in which the connection direction is set on the upper side is already placed in a down direction of the three-direction part to be initially placed. In this case, the three-direction part is initially placed by rotating the initial direction by 90 degrees so that the connection direction is set on each of the right side, the upper side, and the lower side. Consequently, the route of the connection direction of the two-direction I-shaped part adjacent in the right direction of the three-direction part and the route of the connection direction of the one-direction part adjacent in the down direction of the three-direction part are linked together. The routes, however, cannot be linked to the route of the two-direction I-shaped part adjacent in the up direction of the three-direction part, and a route extending in the up direction from the initially placed three-direction part is formed as a movement-impossible route. In a case where the movement-impossible route is thus formed inside the virtual space, in the routes drawn in the route part, the display form of an area corresponding to the movement-impossible route changes to a display form (e.g., a black filled display form in the example shown in FIG. 15) different from that of an area of another route. Consequently, the user who is generating or editing a route in the game world in the virtual space can know from a map image that a route is formed through which the player object cannot pass after the completion of the route.

In the above description, an example has been used where the display form of a movement-impossible route is changed. Alternatively, the display form of a movement-possible route may be changed, or the display forms of both a movement-impossible route and a movement-possible route may be changed. The above changes in the display forms may be made based on a start point and a goal point set on a route. For example, a route where the player object can reach a goal point set on a route from a start point set on the route may be determined as an opened route, and a route that departs from the opened route may be determined as a movement-impossible route. As an example, in a case where the player object starts from any point, passes through a course, and reaches a goal point, and the player object also passes through the course not via a goal point and reaches the start point, and if this point is present on the course, it may be considered that an opened route is set in the virtual space. Then, when a route part is initially placed in the virtual space, a route that does not belong to the opened route may be determined as a movement-impossible route, and the display form of the movement-impossible route may be changed. In the state where the opened route is not set in the virtual space, all the routes formed in the virtual space are determined as movement-impossible routes, and the display forms of the movement-impossible routes may be changed. Then, at the timing when the opened route is opened, a route belonging to the opened route may be determined a movement-possible route, and the display form of the movement-possible route may be changed back to that before the change, or may be further changed to a different display form.

As another example where the placement direction of a route part is automatically changed, when a route part once placed in the virtual space is moved to another placement position in accordance with a user operation, the placement direction when the route part is moved and re-placed is automatically changed. In this case, as a first example, regarding the above placement direction change rules when the initial placement is performed, the placement direction corresponding to the placement position where the route part is re-placed is not changed, and the placement direction corresponding to the connection relationship of the route part to be re-placed with another route part adjacent to the route part is changed. In this case, it is possible that as the placement direction of the route part before the route part is re-placed, the placement direction before the route part is moved is maintained, and when the route part is re-placed, the placement direction is automatically changed in accordance with the connection relationship of the route part with the adjacent route part, similarly to the case of the above initial placement, and the display form of a route is changed. As a second example, similarly to the above placement direction change rules when the initial placement is performed, the placement direction corresponding to the placement position where the route part is re-placed is automatically changed, and the placement direction corresponding to the connection relationship of the route part to be re-placed with another route part adjacent to the route part is also changed. In this case, it is possible that as the placement direction of the route part before the route part is re-placed, similarly to the case of the above initial placement, the placement direction before the route part is moved is automatically changed in accordance with the placement position when the route part is re-placed and the connection relationship of the route part with the adjacent route part, and the display form of a route is changed. As described above, when a route part that is once placed is moved and re-placed, the route part is rotated not based on the above initial direction, but based on the placement direction in which the route part is placed, whereby it is possible to re-place the route part by making use of the placement direction of the route part once placed by the user. Thus, it is also possible to move the route part to another position by leaving the setting of a route before the re-placement.

In the placement direction change rules illustrated above, exception rules may be provided based on the type of the route part, the placement position of the route part, and the connection relationship of the route part with an adjacent part. FIG. 16 is a diagram showing examples of exception rules in the route part placement direction change rules.

In FIG. 16, in the exemplary embodiment, in a case where the two-direction L-shaped part is initially placed or re-placed in the edge portion areas except for the four corner areas of the virtual space, an exception rule to the above placement direction change rules is applied in accordance with the connection relationship with a part adjacent to the two-direction L-shaped part, and the placement direction is set. An exception is thus made to the placement direction change rules, whereby, in a case where a designer creates a route intended by the designer, it is possible to urge the designer to place a route part by giving priority to a convenient placement direction.

For example, in a case where the two-direction L-shaped part is initially placed or re-placed in the "center upper edge area" of the virtual space, and when a connection direction adjacent to the two-direction L-shaped part is not present, or when a connection direction is not present on the left side of the two-direction L-shaped part, and an adjacent connection direction is present on the right side of the two-direction L-shaped part, or when adjacent connection directions are present on the left side and the right side of the two-direction L-shaped part, the two-direction L-shaped part is placed in the placement direction in which the connection direction is set on each of the right side and the lower side. In a case where the two-direction L-shaped part is initially placed or re-placed in the "center upper edge area" of the virtual space, and when a connection direction is not present on the right side of the two-direction L-shaped part, and an adjacent connection direction is present on the left side of the two-direction L-shaped part, the two-direction L-shaped part is placed in the placement direction in which the connection direction is set on each of the left side and the lower side.

For example, in a case where the two-direction L-shaped part is initially placed or re-placed in the "center lower edge area" of the virtual space, and when a connection direction adjacent to the two-direction L-shaped part is not present, or when a connection direction is not present on the right side of the two-direction L-shaped part, and an adjacent connection direction is present on the left side of the two-direction L-shaped part, or when adjacent connection directions are present on the left side and the right side of the two-direction L-shaped part, the two-direction L-shaped part is placed in the placement direction in which the connection direction is set on each of the left side and the upper side. In a case where the two-direction L-shaped part is initially placed or re-placed in the "center lower edge area" of the virtual space, and when a connection direction is not present on the left side of the two-direction L-shaped part, and an adjacent connection direction is present on the right side of the two-direction L-shaped part, the two-direction L-shaped part is placed in the placement direction in which the connection direction is set on each of the right side and the upper side.

For example, in a case where the two-direction L-shaped part is initially placed or re-placed in the "center left edge area" of the virtual space, and when a connection direction adjacent to the two-direction L-shaped part is not present, or when a connection direction is not present on the lower side of the two-direction L-shaped part, and an adjacent connection direction is present on the upper side of the two-direction L-shaped part, or when adjacent connection directions are present on the upper side and the lower side of the two-direction L-shaped part, the two-direction L-shaped part is placed in the placement direction in which the connection direction is set on each of the right side and the upper side. In a case where the two-direction L-shaped part is initially placed or re-placed in the "center left edge area" of the virtual space, and when a connection direction is not present on the upper side of the two-direction L-shaped part, and an adjacent connection direction is present on the lower side of the two-direction L-shaped part, the two-direction L-shaped part is placed in the placement direction in which the connection direction is set on each of the right side and the lower side.

For example, in a case where the two-direction L-shaped part is initially placed or re-placed in the "center right edge area" of the virtual space, and when a connection direction adjacent to the two-direction L-shaped part is not present, or when a connection direction is not present on the lower side of the two-direction L-shaped part, and an adjacent connection direction is present on the upper side of the two-direction L-shaped part, or when adjacent connection directions are present on the upper side and the lower side of the two-direction L-shaped part, the two-direction L-shaped part is placed in the placement direction in which the connection direction is set on each of the left side and the upper side. In a case where the two-direction L-shaped part is initially placed or re-placed in the "center left edge area" of the virtual space, and when a connection direction is not present on the upper side of the two-direction L-shaped part, and an adjacent connection direction is present on the lower side of the two-direction L-shaped part, the two-direction L-shaped part is placed in the placement direction in which the connection direction is set on each of the left side and the lower side.

Figure 17:
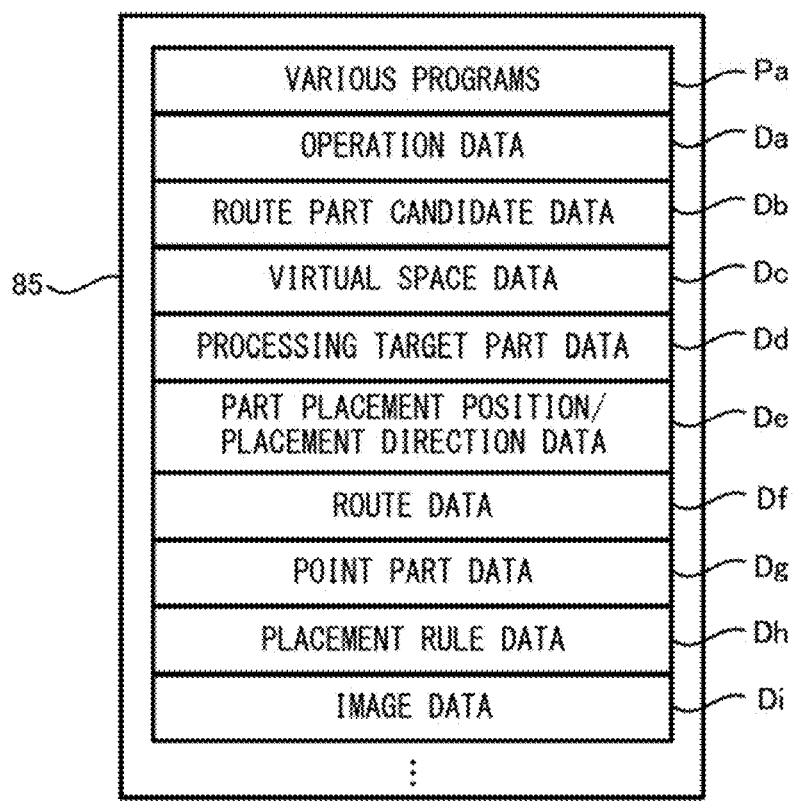
FIG. 17 is a diagram showing a non-limiting example of a data area set in a DRAM 85 of the main body apparatus 2 in the exemplary embodiment.

Next, with reference to FIGS. 17 to 20, a description is given of an example of a specific process executed by the game system 1 in the exemplary embodiment. FIG. 17 is a diagram showing an example of a data area set in the DRAM 85 of the main body apparatus 2 in the exemplary embodiment. It should be noted that in the DRAM 85, in addition to the data shown in FIG. 17, data used in another process is also stored, but is not described in detail here.

In a program storage area of the DRAM 85, various programs Pa, which are executed by the game system 1, are stored. In the exemplary embodiment, as the various programs Pa, an application program for performing information processing (e.g., an editor or a game program for generating or editing a virtual space) based on data acquired from the left controller 3 and/or the right controller 4 and the like are stored. It should be noted that the various programs Pa may be stored in advance in the flash memory 84, or may be acquired from a storage medium attachable to and detachable from the game system 1 (e.g., a predetermined type of a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as information processing executed by the game system 1 is stored. In the exemplary embodiment, the DRAM 85 stores operation data Da, route part candidate data Db, virtual space data Dc, processing target part data Dd, part placement position/placement direction data De, route data Df, point part data Dg, placement rule data Dh, image data Di, and the like.

The operation data Da is operation data appropriately acquired from each of the left controller 3 and/or the right controller 4. As described above, operation data acquired from each of the left controller 3 and/or the right controller 4 includes information regarding an input (specifically, information regarding an operation or the detection result of each sensor) from each of the input sections (specifically, each button, each analog stick, and each sensor). In the exemplary embodiment, operation data is acquired from each of the left controller 3 and/or the right controller 4 through wireless communication, and the operation data Da is appropriately updated using the acquired operation data. It should be noted that the update cycle of the operation data Da may be such that the operation data Da is updated every frame, which is the cycle of the processing described later executed by the main body apparatus 2, or is updated every cycle in which the above operation data is acquired.

The route part candidate data Db is data indicating candidates for route parts that can be placed in a virtual space, and is data indicating the type of a route, the setting of a connection direction, the initial direction (the initial direction), the size, and the like of each type of route part.

The virtual space data Dc is data indicating a virtual space for forming a game world by placing a route part in the virtual space, and is data indicating the shape, the size, divided grid divisions, and the like of the virtual space.

The processing target part data Dd is data indicating a route part that the user selects to initially place or move, and is data indicating the type, the position, the direction, and the like of the route part.

The part placement position/placement direction data De is data indicating the state of a route part placed in a virtual space, and is data indicating the type, the placement position, the placement direction, and the like of the placed route part.

The route data Df is data indicating a route formed in a virtual space, and is data indicating an opened route, a movement-possible route, a movement-impossible route, and the like in the virtual space.

The point part data Dg is data indicating a point part set on a route formed in a virtual space.

The placement rule data Dh is data indicating placement direction change rules, exception rules, and the like when a route part is initially placed or re-placed.

The image data Di is data for displaying an image (e.g., an image of a route part, an image of a virtual space, a background image, or the like) on a display screen (e.g., the display 12 of the main body apparatus 2).

Figure 18:
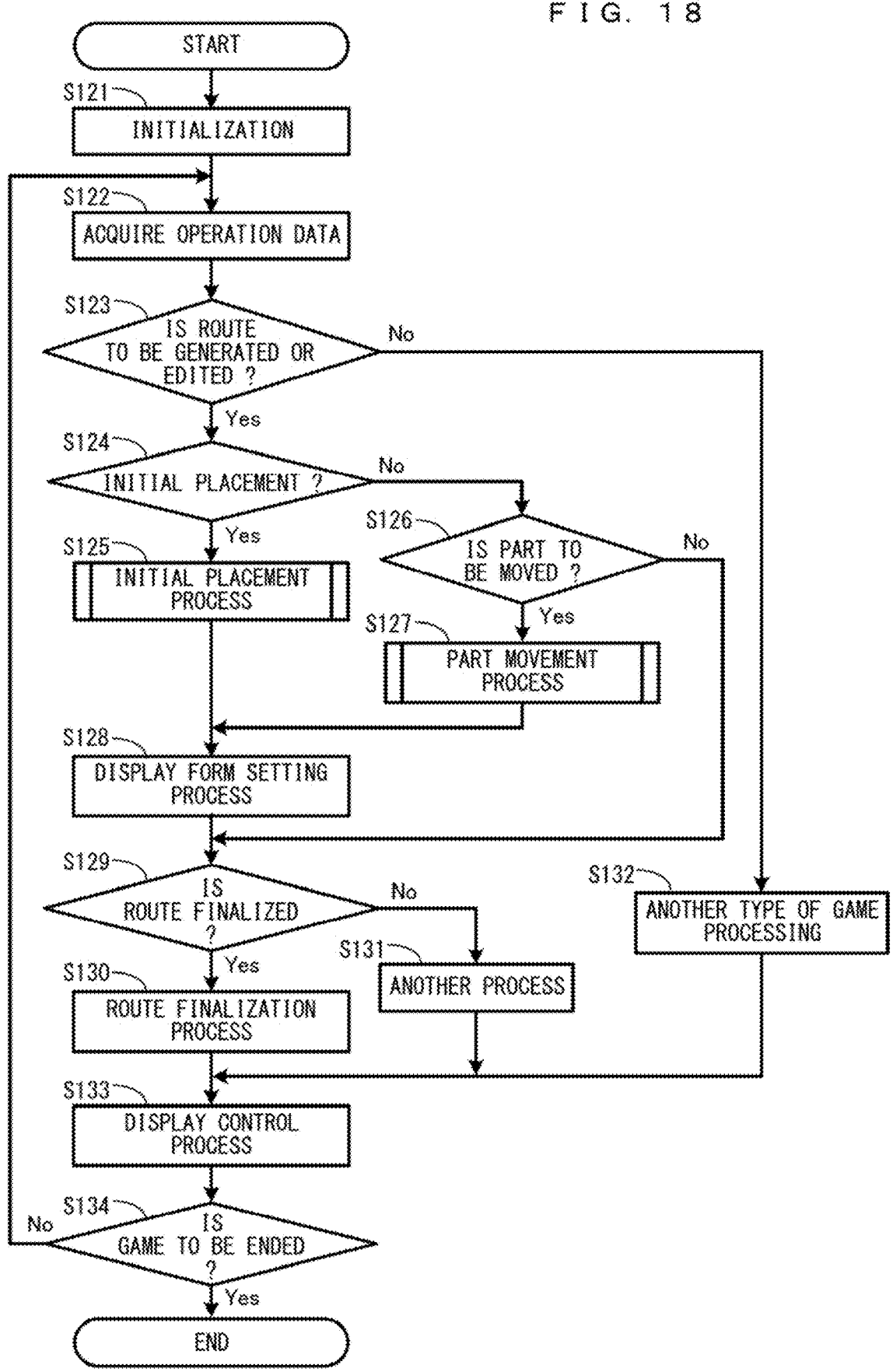
FIG. 18 is a flow chart showing a non-limiting example of information processing executed by a game system 1.
Figure 19:
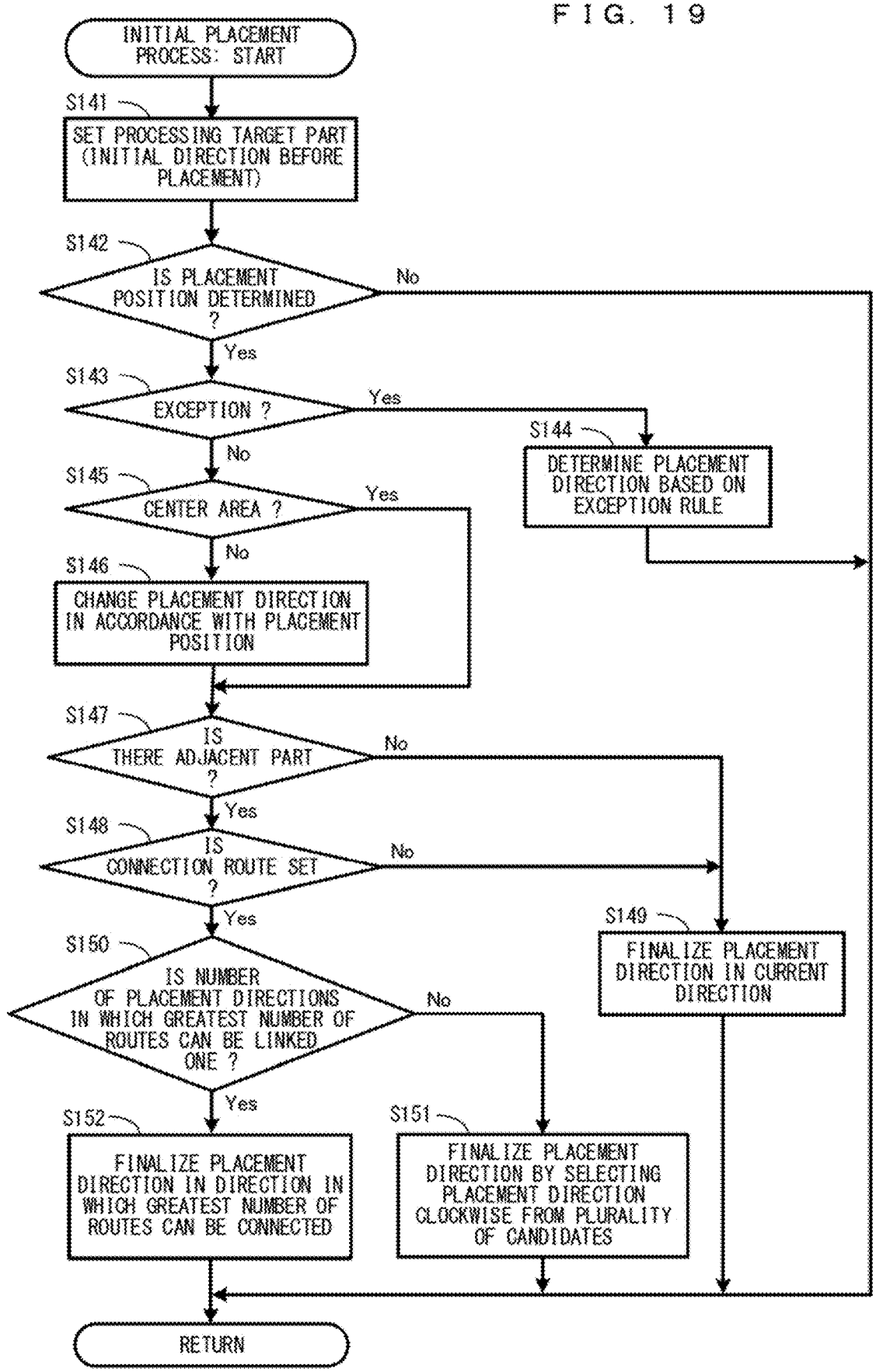
FIG. 19 is a subroutine showing a non-limiting detailed example of an initial placement process performed in step S125 in FIG. 18.
Figure 20:
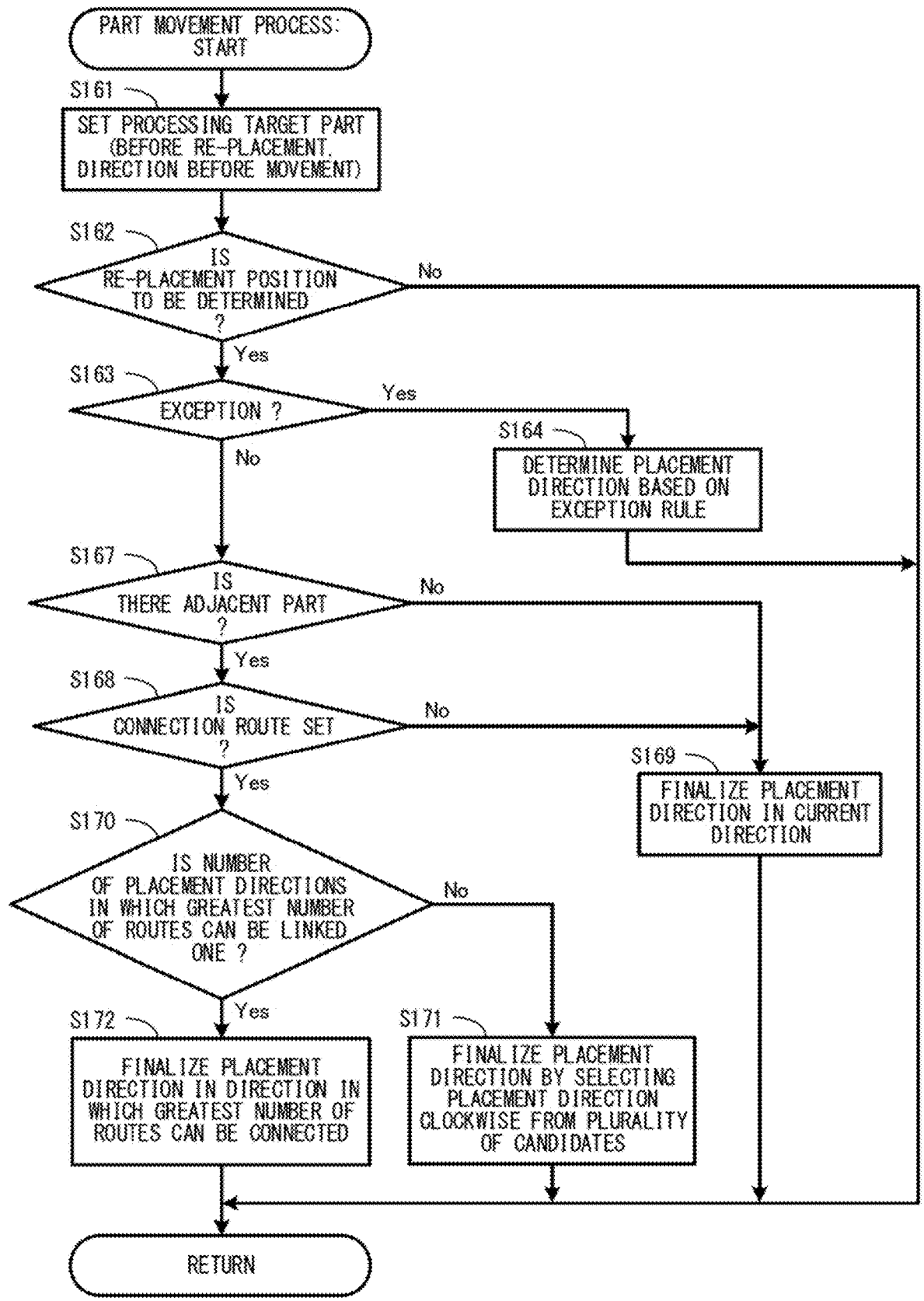
FIG. 20 is a subroutine showing a non-limiting detailed example of a part movement process performed in step S127 in FIG. 18.

Next, with reference to FIGS. 18 to 20, a detailed example of information processing according to the exemplary embodiment is described. FIG. 18 is a flow chart showing an example of information processing executed by the game system 1. FIG. 19 is a subroutine showing a detailed example of an initial placement process performed in step S125 in FIG. 18. FIG. 20 is a subroutine showing a detailed example of a part movement process performed in step S127 in FIG. 18. In the exemplary embodiment, a series of processes shown in FIGS. 18 to 20 is performed by the processor 81 executing a predetermined application program (an editor or a game program) included in the various programs Pa. Further, the information processing shown in FIGS. 18 to 20 is started at any timing.

It should be noted that the processes of all of the steps in the flow charts shown in FIGS. 18 to 20 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 18 to 20 may be executed by the cooperation of a plurality of information processing apparatuses including the main body apparatus 2.

In FIG. 18, the processor 81 performs initialization in the information processing (step S121), and the processing proceeds to the next step. For example, in the initialization, the processor 81 initializes parameters for performing the processing described below. For example, the processor 81 defines a plurality of grid divisions in a virtual space, sets route part candidates, and updates the route part candidate data Db and the virtual space data Dc using the set virtual space and route part candidates. Based on information regarding placement direction change rules, exception rules, and the like set in advance, the processor 81 initializes the placement rule data Dh.

Next, the processor 81 acquires operation data from the left controller 3 and/or the right controller 4 and updates the operation data Da (step S122), and the processing proceeds to the next step.

Next, the processor 81 sets a game world in the virtual space and determines whether or not the process of generating or editing a route is to be performed (step S123). For example, with reference to the operation data Da, if the user performs the operation of starting the process of generating or editing a route, or if the user is performing the process of generating or editing a route, the determination of the processor 81 is affirmative in the above step S123. Then, if the process of generating or editing a route is to be performed, the processing of the processor 81 proceeds to step S124. If, on the other hand, a process other than the process of generating or editing a route is to be performed, the processing of the processor 81 proceeds to step S132.

In step S124, the processor 81 determines whether or not initial placement for placing a new route part in the virtual space is to be performed. Then, if the initial placement is to be performed, the processing of the processor 81 proceeds to step S125. If, on the other hand, the initial placement is not to be performed, the processing of the processor 81 proceeds to step S126.

In step S125, the processor 81 performs an initial placement process, and the processing proceeds to step S128. With reference to FIG. 19, a description is given below of the initial placement process performed in the above step S125.

FIG. 19, the processor 81 sets a processing target part as a target on which the initial placement process is to be performed (step S141), and the processing proceeds to the next step. For example, the processor 81 sets as a processing target part a route part selected from the route part candidates to initially place by a user operation, thereby updating the processing target part data Dd. The processor 81 extracts information regarding the type of the processing target part and the initial direction from the route part candidate data Db and also sets the position of the processing target part in the virtual space based on the content of the user operation indicated by the operation data Da, thereby updating the processing target part data Dd.

Next, the processor 81 determines whether or not the operation of determining the placement position of the processing target part in the virtual space is performed (step S142). For example, with reference to the operation data Da, if the operation of initially placing the processing target part in a grid division in the virtual space is performed, the determination of the processor 81 is affirmative in the above step S142. Then, if the operation of determining the placement position is performed, the processor 81 places the processing target part in the initial direction at the placement position and updates the part placement position/placement direction data De based on the placement, and the processing proceeds to step S143. If, on the other hand, the operation of determining the placement position is not performed, and the operation of initially placing a route part continues, the processing of this subroutine ends.

In step S143, regarding the route part of which the placement position is determined, the processor 81 determines whether or not an exception rule (see FIG. 16) is to be applied. For example, with reference to the exception rules in the placement rule data Dh, if any of the exception rules is to be applied to the route part of which the placement position is determined and which is placed, the determination of the processor 81 is affirmative in the above step S143. Then, if the exception rule is to be applied to the route part of which the placement position is determined, the processing of the processor 81 proceeds to step S144. If, on the other hand, the exception rule is not to be applied to the route part of which the placement position is determined, the processing of the processor 81 proceeds to step S145.

In step S144, based on the exception rule to be applied to the route part of which the placement position is determined, the processor 81 changes and finalizes the placement direction of the route part, and the processing of this subroutine ends. For example, based on the exception rule to be applied to the route part of which the placement position is determined and the connection relationships of the route part with parts adjacent to the route part that are indicated by the part placement position/placement direction data De, the processor 81 changes the placement direction of the route part, thereby updating the part placement position/placement direction data De. Then, the initial placement process ends. The method for changing the placement direction of the route part using the exception rules has been described with reference to FIG. 16, and therefore, is not described in detail here.

In step S145, with reference to the virtual space data Dc, the processor 81 determines whether or not the placement position determined in the above step S142 is the "center area" in the virtual space. Then, if the determined placement position is not the "center area", the processing of the processor 81 proceeds to step S146. If, on the other hand, the determined placement position is the "center area", the processing of the processor 81 proceeds to step S147.

In step S146, based on the placement position of the route part of which the placement position is determined, the processor 81 changes the placement direction of the route part, and the processing proceeds to step S147. For example, based on the placement direction change rules in the placement rule data Dh, the processor 81 changes the placement direction of the route part initially placed in accordance with the determined placement position and updates the part placement position/placement direction data De using the placement direction after the change. The method for changing the placement direction of the route part using the placement direction change rules has been described with reference to FIGS. 10 and 11, and therefore, is not described in detail here.

In step S147, with reference to the part placement position/placement direction data De, the processor 81 determines whether or not there is a route part adjacent to the route part of which the placement position is determined. Then, if there is a route part adjacent to the route part of which the placement position is determined, the processing of the processor 81 proceeds to step S148. If, on the other hand, there is not a route part adjacent to the route part of which the placement position is determined, the processing of the processor 81 proceeds to step S149.

In step S148, the processor 81 determines whether or not a connection route is set in the route part adjacent to the route part of which the placement position is determined. For example, with reference to the part placement position/placement direction data De, the processor 81 extracts a connection direction set in the route part adjacent to the route part of which the placement position is determined. If the connection direction is set on the side in contact with the route part of which the placement position is determined, the determination is affirmative in the above step S148. Then, if a connection route is not set in the adjacent route part, the processing of the processor 81 proceeds to step S149. If, on the other hand, a connection route is set in the adjacent route part, the processing of the processor 81 proceeds to step S150.

In step S149, the processor 81 finalizes in the currently set direction the placement direction of the route part of which the placement position is determined, and the processing of this subroutine ends. For example, the processor 81 finalizes the placement direction by determining as the currently set direction the placement direction of the route part of which the placement position set in the part placement position/placement direction data De is determined, and the initial placement process ends.

In step S150, with reference to the part placement position/placement direction data De, the processor 81 determines whether or not there are a plurality of placement directions in which the greatest number of routes can be linked to the adjacent route part by rotating at the placement position the route part of which the placement position is determined. Then, if there are a plurality of placement directions in which the greatest number of routes can be linked, the processing of the processor 81 proceeds to step S151. If, on the other hand, there is a single placement direction in which the greatest number of routes can be linked, the processing of the processor 81 proceeds to step S152.

In step S151, among the plurality of placement direction candidates in which the greatest number of routes can be linked, the processor 81 finalizes as the placement direction a placement direction candidate reached first by rotating the route part of which the placement position is determined, in a predetermined direction (e.g., clockwise) from the placement direction set for the route part, and the processing of this subroutine ends. For example, using the placement direction of the route part selected from the placement direction candidates, the processor 81 updates and finalizes the part placement position/placement direction data De of the route part of which the placement position is determined, and the initial placement process ends. The method for changing the placement direction of the route part to be initially placed based on the connection relationship of the route part with a part adjacent to the route part has been described with reference to FIG. 12, and therefore, is not described in detail here.

In step S152, the processor 81 finalizes the placement direction in which the greatest number of routes can be linked, as the placement direction of the route part to be initially placed, and the processing of this subroutine ends. For example, using the placement direction in which the greatest number of routes can be linked, the processor 81 updates and finalizes the part placement position/placement direction data De of the route part of which the placement position is determined, and the initial placement process ends. The method for changing the placement direction of the route part to be initially placed based on the connection relationship of the route part with a part adjacent to the route part has been described with reference to FIG. 12, and therefore, is not described in detail here.

Referring back to FIG. 18, if it is determined in the above step S124 that the initial placement is not to be performed, the processor 81 determines whether or not an already placed route part is to be moved (the route part is to be re-placed) in the virtual space. Then, if the route part is to be moved, the processing of the processor 81 proceeds to step S127. If, on the other hand, the route part is not to be moved, the processing of the processor 81 proceeds to step S129.

In step S127, the processor 81 performs a part movement process, and the processing proceeds to step S128. With reference to FIG. 20, a description is given below of the part movement process performed in the above step S127.

In FIG. 20, the processor 81 sets a processing target part as a target on which the part movement process is to be performed (step S161), and the processing proceeds to the next step. For example, the processor 81 sets as a processing target part an already placed route part selected to move and re-place by a user operation, thereby updating the processing target part data Dd. The processor 81 sets information regarding the type of the processing target part and the placement direction before the re-placement using the part placement position/placement direction data De and also sets the position of the processing target part in the virtual space based on the content of the user operation indicated by the operation data Da, thereby updating the processing target part data Dd. The placement direction before the re-placement of the processing target part is the placement direction finalized before the processing target part is moved based on the part placement position/placement direction data De.

Next, the processor 81 determines whether or not the operation of determining the re-placement position of the processing target part in the virtual space is performed (step S162). For example, with reference to the operation data Da, if the operation of re-placing the processing target part in a grid division in the virtual space is performed, the determination of the processor 81 is affirmative in the above step S162. Then, if the operation of determining the re-placement position is performed, the processor 81 places the processing target part in the placement direction finalized before the processing target part is moved to the re-placement position, thereby updating the part placement position/placement direction data De based on the re-placement, and the processing proceeds to step S163. If, on the other hand, the operation of determining the re-placement position is not performed, and the operation of moving a route part continues, the processing of this subroutine ends.

In step S163, regarding the route part of which the re-placement position is determined, the processor 81 determines whether or not an exception rule (see FIG. 16) is to be applied. For example, with reference to the exception rules in the placement rule data Dh, if any of the exception rules is to be applied to the route part of which the re-placement position is determined and which is re-placed, the determination of the processor 81 is affirmative in the above step S163. Then, if the exception rule is to be applied to the route part of which the re-placement position is determined, the processing of the processor 81 proceeds to step S164. If, on the other hand, the exception rule is not to be applied to the route part of which the re-placement position is determined, the processing of the processor 81 proceeds to step S167.

In step S164, based on the exception rule to be applied to the route part of which the re-placement position is determined, the processor 81 changes and finalizes the placement direction of the route part, and the processing of this subroutine ends. For example, based on the exception rule to be applied to the route part of which the re-placement position is determined and the connection relationships of the route part with parts adjacent to the route part that are indicated by the part placement position/placement direction data De, the processor 81 changes the placement direction of the route part, thereby updating the part placement position/placement direction data De. Then, the part movement process ends. The method for changing the placement direction of the route part using the exception rules has been described with reference to FIG. 16, and therefore, is not described in detail here.

In step S167, with reference to the part placement position/placement direction data De, the processor 81 determines whether or not there is a route part adjacent to the route part of which the re-placement position is determined. Then, if there is a route part adjacent to the route part of which the re-placement position is determined, the processing of the processor 81 proceeds to step S168. If, on the other hand, there is not a route part adjacent to the route part of which the re-placement position is determined, the processing of the processor 81 proceeds to step S169.

In step S168, the processor 81 determines whether or not a connection route is set in the route part adjacent to the route part of which the re-placement position is determined. For example, with reference to the part placement position/placement direction data De, the processor 81 extracts a connection direction set in the route part adjacent to the route part of which the re-placement position is determined. If the connection direction is set on the side in contact with the route part of which the re-placement position is determined, the determination is affirmative in the above step S168. Then, if a connection route is not set in the adjacent route part, the processing of the processor 81 proceeds to step S169. If, on the other hand, a connection route is set in the adjacent route part, the processing of the processor 81 proceeds to step S170.

In step S169, the processor 81 finalizes in the currently set direction the placement direction of the route part of which the re-placement position is determined, and the processing of this subroutine ends. For example, the processor 81 finalizes the placement direction by determining as the currently set direction the placement direction of the route part of which the re-placement position is set in the part placement position/placement direction data De is determined, and the part movement process ends.

In step S170, with reference to the part placement position/placement direction data De, the processor 81 determines whether or not there are a plurality of placement directions in which the greatest number of routes can be linked to the adjacent route part by rotating at the re-placement position the route part of which the re-placement position is determined. Then, if there are a plurality of placement directions in which the greatest number of routes can be linked, the processing of the processor 81 proceeds to step S171. If, on the other hand, there is a single placement direction in which the greatest number of routes can be linked, the processing of the processor 81 proceeds to step S172.

In step S171, among the plurality of placement direction candidates in which the greatest number of routes can be linked, the processor 81 finalizes as the placement direction a placement direction candidate reached first by rotating the route part of which the re-placement position is determined, in a predetermined direction (e.g., clockwise) from the placement direction set for the route part, and the processing of this subroutine ends. For example, using the placement direction of the route part selected from the placement direction candidates, the processor 81 updates and finalizes the part placement position/placement direction data De of the route part of which the re-placement position is determined, and the part movement process ends. The method for changing the placement direction of the route part to be re-placed based on the connection relationship of the route part with a part adjacent to the route part has been described with reference to FIG. 12, and therefore, is not described in detail here.

In step S172, the processor 81 finalizes the placement direction in which the greatest number of routes can be linked, as the placement direction of the route part to be re-placed, and the processing of this subroutine ends. For example, using the placement direction in which the greatest number of routes can be linked, the processor 81 updates and finalizes the part placement position/placement direction data De of the route part of which the re-placement position is determined, and the part movement process ends. The method for changing the placement direction of the route part to be re-placed based on the connection relationship of the route part with a part adjacent to the route part has been described with reference to FIG. 12, and therefore, is not described in detail here.

Referring back to FIG. 18, in step S128, the processor 81 performs the process of setting a display form, and the processing proceeds to step S129. For example, based on the part placement position/placement direction data De, if a route formed in the virtual space is changed in connection with the newly initially placed route part or the route part of which the placement position is changed, the processor 81 generates a map image in which the display form of the route is changed in accordance with the change. For example, if a route part in the virtual space is changed (e.g., initially placed, re-placed, or deleted), in accordance with a route drawn in the route part, the processor 81 changes a route formed in the virtual space. As an example, in a case where a newly linked route is generated between route parts, or the state where the routes of the route parts are linked together is cancelled, the processor 81 changes the display forms of the route parts to display forms indicating the linked states of routes drawn in the route parts, and based on the positions of point parts indicated by the point part data Dg, sets display forms corresponding to the types (a movement-possible route or a movement-impossible route) of the routes, thereby generating a map image in the virtual space. As described above, in a case where a newly linked route is generated between route parts, it is possible to produce an effect in the game in which the player object can move between the route parts, and in a case where routes are not linked together between route parts, the player object cannot move between the route parts, and therefore, it is not possible to produce the effect in the game.

In step S129, the processor 81 determines whether or not a route in the game world formed in the virtual space is finalized. For example, with reference to the operation data Da, if the user ends the process of generating or editing a route and performs the operation of finalizing the route, the determination of the processor 81 is affirmative in the above step S129. Then, if the route is finalized, the processing of the processor 81 proceeds to step S130. If, on the other hand, the route is not finalized, the processing of the processor 81 proceeds to step S131.

In step S130, the processor 81 performs a route finalization process, and the processing proceeds to step S133. For example, based on the part placement position/placement direction data De and the route data Df, the processor 81 performs the process of finalizing a route in the game world currently formed in the virtual space, as a route to be used in the game where the player object is moved. As an example, the processor 81 performs the process of deleting a movement-impossible route among routes in the game world currently formed in the virtual space, thereby leaving only a movement-possible route, i.e., an opened route, in the virtual space. Thus, the processor 81 generates a map image in which a route on which the player object can move from a start point to a goal point is drawn.

In step S131, in accordance with a user operation, the processor 81 performs another process in the process of generating or editing a route, and the processing proceeds to step S133. As a first example, as the above other process, there is the process of, in accordance with a user operation, changing the placement direction of an already placed route part, thereby updating the part placement position/placement direction data De. As a second example, as the above other process, there is the process of, in accordance with a user operation, placing a point part on the route, thereby updating the point part data Dg. As a third example, as the above other process, there is the process of, based on the placement situation of a route part, changing the placement direction of an already placed particular route part, thereby updating the part placement position/placement direction data De, and the like. The method for changing the placement direction of a particular route part has been described with reference to FIG. 13, and therefore, is not described in detail here.

In step S132, the processor 81 performs another type of game processing, and the processing proceeds to step S133. Here, the other type of game processing performed in the above step S132 refers to game processing other than the process of generating or editing a route. Game processing for moving the player object using a finalized route in accordance with an object movement operation of the user, the process of generating or editing a game space different from the game world where the above route is generated, and the like are possible.

In step S133, the processor 81 performs a display control process, and the processing proceeds to the next step. For example, if a route is currently generated or edited in the virtual space, based on the virtual space data Dc, the part placement position/placement direction data De, the route data Df, the point part data Dg, and the image data Di, the processor 81 performs control for displaying a route part, a point part, and the like placed in the virtual space, using a set display form, and also based on the processing target part data Dd, performs control for placing a route part that is moving in the virtual space, and displaying the route part. If it is after the route is finalized, the processor 81 performs control for displaying the virtual space where the player object in the game world where the finalized route is drawn is placed, and the like.

Next, the processor 81 determines whether or not the game processing is to be ended (step S134). Examples of a condition for ending the game processing in the above step S134 include the fact that a condition for ending the game processing is satisfied, the fact that the user performs the operation of ending the game processing, and the like. If the game processing is not to be ended, the processing returns to the above step S122, and the process of step S124 is repeated. If the game processing is to be ended, the processing of the flow chart ends. Hereinafter, the series of processes of steps S122 to S134 is repeatedly executed until it is determined in step S134 that the processing is to be ended.

As described above, in the exemplary embodiment, when a route part is placed in a virtual space in accordance with a user operation, the placement direction is automatically changed to avoid a movement-impossible route. Thus, it is possible to reduce the number of operations and the operation amount of the user required to place the route part.

On a course in the above exemplary embodiment, two or more start points or two or more goal points may be able to be set. On a virtual space, a plurality of opened routes may be set. In the above exemplary embodiment, an example has been used where a course where a player object can move is set in a virtual space. Alternatively, another form may be employed so long as, in a case where a plurality of parts are connected together, a different effect in the game from that in a case where a plurality of parts are not connected together is produced. For example, another form may be employed, such as a form in which water flows through a pipeline completed by placing a plurality of parts in which a part of a pipe is drawn, a form in which electricity flows (a current carrying portion shines) through a conductor line completed by placing a plurality of parts in which a part of a conductor (e.g., an electric wire) is drawn, or the like.

In the above exemplary embodiment, an example has been used where square parts are placed in a plurality of square grid divisions. Alternatively, the shapes of grid divisions and parts may be other regular polygon shapes. For example, regular triangle parts that can be placed in a plurality of regular triangle grid divisions may be placed, or regular hexagon parts that can be placed in a plurality of regular hexagon grid divisions may be placed.

Further, the game system 1 may be any apparatus, and may be a mobile game apparatus, any mobile electronic device (a PDA (Personal Digital Assistant)), a mobile phone, a personal computer, a camera, a tablet, or the like. In this case, an input device for performing the operation of moving an object may not be the left controller 3 or the right controller 4, and may be another controller, a mouse, a touch pad, a touch panel, a trackball, a keyboard, a directional pad, a slide pad, or the like.

Further, the above descriptions have been given using an example where the game system 1 performs information processing. Alternatively, another apparatus may perform at least some of the processing steps. For example, if the game system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information above processing are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an information processing program, an information processing apparatus, an information processing system, an information processing method, and the like that are capable of facilitating the operation of placing a part in a virtual space.

What is claimed is:

1. A non-transitory computer-readable storage medium having stored therein instructions that, when executed by a processor of an inform ad on processing apparatus, cause the information processing apparatus to perform operations comprising:
   in accordance with a placement operation of a user, placing, in a first placement direction in a virtual space displayed on a display device, a part that includes at least one connection direction, wherein the virtual space is a two-dimensional space including; a plurality of square grid divisions, and the part is square;
   in accordance with a rotation operation of the user, rotating the part placed in the first placement direction in the virtual space so that the part is placed in a second placement direction;
   if a first part and a second part that are the part placed in the virtual space are adjacent to each other, based on combinations of at least a direction in which the first part is adjacent to the second part, the connection direction included in the first part, and the connection direction included in the second part, determining whether or not the first part and the second part are connected together; and
   if the first part and the second part are connected together, producing in the first part and the second part an effect in a game different from an effect in a game in a case where the first part and the second part are not connected together,
   wherein the placement includes:
      in accordance with a placement position in the virtual space where the part is placed in the virtual space, determining the first placement direction by rotating the part to be placed in each of the square grid divisions by 90 degrees each time when the part is newly placed in the virtual space; and
      updating drawing of the part in the virtual space, displayed on the display device, based on the determined first placement direction.

2. The non-transitory computer-readable storage medium according to claim 1, wherein the instructions further cause the information processing apparatus to perform operations comprising, in accordance with an object movement operation of the user, moving a movement object placed in the virtual space at least within the part placed by the placement operation, and the production of the effect includes, if it is determined that the first part and the second part are connected together, permitting the movement object to move from within the first part to within the second part and also from within the second part to within the first part.

3. The non-transitory computer-readable storage medium according to claim 2, wherein the part includes, within the part, at least one of a movement-possible route that is a route on which the movement object can move, and a movement-impossible route that is a route on which the movement object cannot move, and the instructions further cause the information processing apparatus to perform operations comprising, if a part including the movement-possible route is placed, generating a map image representing at least the movement-possible route to display the map image on a display screen.

4. The non-transitory computer-readable storage medium according to claim 3, wherein the generation of the map image includes, if a part including the movement-impossible route is placed, generating the map image including, within the part, the movement-impossible route a display form of which is different from a display form of the movement-possible route.

5. The non-transitory computer-readable storage medium according to claim 4, wherein the generation of the map image includes generating the map image by, in a route of the part placed in an edge portion of the virtual space, determining as the movement-impossible route a route extending from the edge portion of the virtual space toward outside the virtual space.

6. The non-transitory computer-readable storage medium according to claim 1, wherein the placement includes, in a case where the part is to be newly placed in the virtual space, and if there is at least one adjacent part that is already placed in the virtual space and is a part adjacent to the part, determining the first placement direction so that the greatest number of the adjacent parts are connected to the part.

7. The non-transitory computer-readable storage medium according to claim 6, wherein the placement includes, in a case where the part is to be newly placed in the virtual space, and if there are a plurality of placement directions in which the greatest number of the adjacent parts are connected to the part, determining, among the plurality of placement directions, a placement direction obtained with the smallest amount of rotation obtained by rotating clockwise from an initial direction set for the part, as the first placement direction.

8. The non-transitory computer-readable storage medium according to claim 6, wherein the placement includes, in a case where the part is to be newly placed in the virtual space, and if there are a plurality of placement directions in which the greatest number of the adjacent parts are connected to the part, and also if the part is placed in an edge portion of the virtual space, determining, among the plurality of placement directions, a placement direction in which the smallest number of the connection directions are directed from the edge portion of the virtual space toward outside the virtual space, as the first placement direction.

9. The non-transitory computer-readable storage medium according to claim 1, wherein the instructions further cause the information processing apparatus to perform operations comprising moving at least one of the parts placed in the virtual space to a different position in the virtual space in accordance with a part movement operation of the user and placing the at least one of the parts.

10. The non-transitory computer-readable storage medium according to claim 9, wherein
the movement of the at least one of the parts to the different position and the placement of the at least one of the parts include,
in a case where the part placed in the virtual space in a pre-movement placement direction that is a placement direction before a movement is moved as a movement part to the different position,
if there is not an adjacent part that is already placed in the virtual space and is a part adjacent to the movement part after the movement, placing the movement part in the virtual space by maintaining the pre-movement placement direction, regardless of a placement position in the virtual space after the movement, and
if there is the at least one adjacent part, placing the movement part in the virtual space in a post-movement placement direction that is a placement direction of the movement part after a movement, so that the greatest number of the adjacent parts are connected to the movement part after the movement.

11. The non-transitory computer-readable storage medium according to claim 10, wherein the movement of the at least one of the parts to the different position and the placement of the at least one of the parts include, if there are a plurality of placement directions in which the greatest number of the adjacent parts are connected to the movement part after the movement, determining, among the plurality of placement directions, a placement direction obtained with the smallest amount of rotation obtained by rotating clockwise from the pre-movement placement direction, as the post-movement placement direction.

12. The non-transitory computer-readable storage medium according to claim 1, wherein the placement includes placing in the virtual space the part selected from a plurality of types of parts different from each other in the connection direction.

13. The non-transitory computer-readable storage medium according to claim 1, wherein the placement includes, in a case where the part is to be placed in an edge portion area that is an edge portion of the virtual space, determining the first placement direction so that among the connection directions included in the part, the smallest number of the connection directions are directed from the edge portion of the virtual space toward outside the virtual space.

14. The non-transitory computer-readable storage medium according to claim 1, wherein
the placement includes placing in the virtual space the part selected from at least a one-direction part including the connection direction only on one side of the part, a two-direction I-shaped part including the connection direction on each of two sides opposed to each other in the part, a two-direction L-shaped part including the connection direction on each of two sides adjacent to each other in the part, and a three-direction part including the connection direction on each of three sides of the part.

15. The non-transitory computer-readable storage medium according to claim 14, wherein
the placement includes, in a case where the part is to be placed in a center area except for an edge portion of the virtual space, determining the first placement direction so that the connection direction of the one-direction part is a right direction, determining the first placement direction so that the connection direction of the two-direction I-shaped part is a left direction and the right direction, determining the first placement direction so that the connection direction of the two-direction L-shaped part includes at least the left direction, and determining the first placement direction so that the connection direction of the three-direction part includes at least the left direction and an up direction.

16. The non-transitory computer-readable storage medium according to claim 14, wherein the placement includes, in a case where the part is to be placed in an upper edge area that is an upper edge portion of the virtual space and in a lower edge area that is a lower edge portion of the virtual space, determining the first placement direction of each of the parts having the plurality of connection directions so that the connection directions have a relationship where the connection directions are obtained by rotating the others by 180 degrees.

17. The non-transitory computer-readable storage medium according to claim 14, wherein the placement includes, in a case where the part is to be placed in a left edge area that is a left edge portion of the virtual space and in a right edge area that is a right edge portion of the virtual space, determining the first placement direction of each of the parts so that the parts have a relationship where the connection directions of the parts are obtained by horizontally flipping the others.

18. The non-transitory computer-readable storage medium according to claim 14, wherein the placement includes, in a case where the one-direction part is to be placed in a right edge area that is a right edge portion of the virtual space, determining the first placement direction so that the connection direction is a left direction, and in a case where the one-direction part is to be placed in an area except for the right edge area of the virtual space, determining the first placement direction so that the connection direction is a right direction.

19. The non-transitory computer-readable storage medium according to claim 14, wherein the placement includes, in a case where the two-direction I-shaped part is to be placed in, in a left edge portion and a right edge portion of the virtual space, a left and right edge center area obtained by excluding upper and lower edge portions, determining the first placement direction so that the connection direction is an up direction and a down direction, and in a case where the two-direction I-shaped part is to be placed in, in the left edge portion and the right edge portion of the virtual space, an area obtained by excluding the left and right edge center area of the virtual space, determining the first placement direction so that the connection direction is a left direction and a right direction.

20. The non-transitory computer-readable storage medium according to claim 14, wherein the placement includes, in a case where the two-direction L-shaped part is to be placed in a corner portion area that is a corner portion of the virtual space, determining the first placement direction so that the connection direction is not directed from the corner portion of the virtual space toward outside the virtual space.

21. The non-transitory computer-readable storage medium according to claim 14, wherein the placement includes, in a case where the three-direction part is to be placed in a center area that is not adjacent to an edge portion of the virtual space, determining the first placement direction so that the connection direction is a left direction, a down direction, and a right direction.

22. The non-transitory computer-readable storage medium according to claim 14, wherein the placement includes, in a case where the part is to be placed at a position adjacent to the one-direction part already placed in the virtual space, and if there is not another part that can be connected to the one-direction part in a direction other than a direction in which the part is placed among up, down, left, and right directions of the one-direction part, changing a placement direction of the one-direction part so that the one-direction part is connected to the part.

23. An information processing apparatus, comprising:
a display device;
a processor; and
a memory configured to store computer readable instructions that, when executed by the processor, cause the information processing apparatus to:

in accordance with a placement operation of a user, place, in a first placement direction in a virtual space displayed on a display device, a part that includes at least one connection direction, wherein the virtual space is a two-dimensional space including a plurality of square grid divisions, and the part is square;
in accordance with a rotation operation of the user, change the part placed in the first placement direction in the virtual space so that the part is placed in a second placement direction;
if a first part and a second part that are the part placed in the virtual space are adjacent to each other, based on combinations of at least a direction in which the first part is adjacent to the second part, the connection direction included in the first part, and the connection direction included in the second part, determine whether or not the first part and the second part are connected together; and
if the first part and the second part are connected together, produce in the first part and the second part an effect in a game different from an effect in a game in a case where the first part and the second part are not connected together,
wherein the placement includes:
in accordance with a placement position in the virtual space where the part is placed in the virtual space, determining the first placement direction by rotating the part to be placed in each of the square grid divisions by 90 degrees each time when the part is newly placed in the virtual space; and
updating drawing of the part in the virtual space, displayed on the display device, based on the determined first placement direction.

24. An information processing system including at least an information processing apparatus, the information processing system comprising:
a processor; and
a memory configured to store computer readable instructions that, when executed by the processor, cause the information processing system to:
in accordance with a placement operation of a user, place, in a first placement direction in a virtual space displayed on a display device, a part that includes at least one connection direction, wherein the virtual space is a two-dimensional space including a plurality of square grid divisions, and the part is square;
in accordance with a rotation operation of the user, change the part placed in the first placement direction in the virtual space so that the part is placed in a second placement direction;
if a first part and a second part that are the part placed in the virtual space are adjacent to each other, based on combinations of at least a direction in which the first part is adjacent to the second part, the connection direction included in the first part, and the connection direction included in the second part, determine whether or not the first part and the second part are connected together; and
if the first part and the second part are connected together, produce in the first part and the second part an effect in a game different from an effect in a game in a case where the first part and the second part are not connected together,
wherein the placement includes:
in accordance with a placement position in the virtual space where the part is placed in the virtual space, determining the first placement direction by rotating the part to be placed in each of the square grid divisions by 90 degrees each time when the part is newly placed in the virtual space; and updating drawing of the part in the virtual space, displayed on the display device, based on the determined first placement direction.

25. An information processing method comprising:

in accordance with a placement operation of a user, placing, in a first placement direction in a virtual space displayed on a display device, a part that includes at least one connection direction, wherein the virtual space is a two-dimensional space including a plurality of square grid divisions, and the part is square;

in accordance with a rotation operation of the user, changing the part placed in the first placement direction in the virtual space so that the part is placed in a second placement direction;

if a first part and a second part that are the part placed in the virtual space are adjacent to each other, based on combinations of at least a direction in which the first part is adjacent to the second part, the connection direction included in the first part, and the connection direction included in the second part, determining whether or not the first part and the second part are connected together; and if the first part and the second part are connected together, producing in the first part and the second part an effect in a game different from an effect in a game in a case where the first part and the second part are not connected together, wherein the placement includes:

in accordance with a placement position in the virtual space where the part is placed in the virtual space, determining the first placement direction by rotating the part to be placed in each of the square grid divisions by 90 degrees each time when the part is newly placed in the virtual space; and updating drawing of the part in the virtual space, displayed on the display device, based on the determined first placement direction.

* * * * *